United States Patent
Noda et al.

(10) Patent No.: US 9,341,459 B2
(45) Date of Patent: May 17, 2016

(54) FORM MEASURING APPARATUS AND MEASURING METHOD FOR V GROOVE CENTER

(71) Applicant: MITUTOYO CORPORATION, Kanagawa (JP)

(72) Inventors: Takashi Noda, Tochigi (JP); Hiroshi Kamitani, Tochigi (JP); Kazumi Mizukami, Moka (JP)

(73) Assignee: MITUTOYO CORPORATION, Kanagawa (JP)

( * ) Notice: Subject to any disclaimer, the term of this patent is extended or adjusted under 35 U.S.C. 154(b) by 160 days.

(21) Appl. No.: 14/464,184

(22) Filed: Aug. 20, 2014

(65) Prior Publication Data

US 2015/0052769 A1    Feb. 26, 2015

(30) Foreign Application Priority Data

Aug. 26, 2013 (JP) ................................. 2013-174569

(51) Int. Cl.
  *G01B 5/008* (2006.01)
  *G01B 5/20* (2006.01)
  *G01B 21/04* (2006.01)

(52) U.S. Cl.
  CPC .............. *G01B 5/008* (2013.01); *G01B 5/204* (2013.01); *G01B 21/047* (2013.01)

(58) Field of Classification Search
  CPC ...................................................... G01B 5/008
  USPC .......................................................... 33/503
  See application file for complete search history.

(56) References Cited

U.S. PATENT DOCUMENTS

| | | | | |
|---|---|---|---|---|
| 5,461,797 A * | 10/1995 | Royer | ................... | G01B 5/202 33/501.14 |
| 6,460,261 B1* | 10/2002 | Noda | ................... | G01B 5/241 33/199 R |

(Continued)

FOREIGN PATENT DOCUMENTS

| JP | 2005-345123 A | 12/2005 |
|---|---|---|
| JP | 2010-014638 A | 1/2010 |

OTHER PUBLICATIONS

U.S. Appl. No. 13/425,762 to Kentaro Nemoto et al., filed Mar. 21, 2012.

(Continued)

*Primary Examiner* — Christopher Fulton
(74) *Attorney, Agent, or Firm* — Greenblum & Bernstein, P.L.C.

(57) ABSTRACT

Controller executes a first scanning control, causing a driver to move a probe such that a tip scans along an inclined surface of a V groove to approach a center of the V groove, and a second scanning control, causing the driver to move the probe such that the tip scans along the inclined surface of the V groove to approach the center of the V groove from a side opposite that of the first scanning control. Angle calculator calculates an angle created between a direction of a deflection vector of the probe and a predetermined direction. Threshold value-correspondent coordinate obtainer obtains coordinates of the tip where the angle has changed to exceed a first threshold value during execution of the first scanning control and obtains coordinates of the tip where the angle has changed to exceed a second threshold value during execution of the second scanning control.

7 Claims, 14 Drawing Sheets

(56) References Cited

U.S. PATENT DOCUMENTS

| | | | |
|---|---|---|---|
| 7,392,692 B2 | 7/2008 | Noda | |
| 7,647,706 B2 * | 1/2010 | Jordil | G01B 21/045 33/503 |
| 8,302,322 B2 | 11/2012 | Yasuno et al. | |
| 8,478,564 B2 | 7/2013 | Noda et al. | |
| 9,103,648 B2 * | 8/2015 | Noda | G01B 21/04 |
| 2013/0310962 A1 | 11/2013 | Noda et al. | |
| 2014/0025336 A1 | 1/2014 | Noda et al. | |
| 2014/0059872 A1 | 3/2014 | Nakagawa et al. | |

OTHER PUBLICATIONS

U.S. Appl. No. 14/464,224 to Takashi Noda et al., filed Aug. 20, 2014.

* cited by examiner

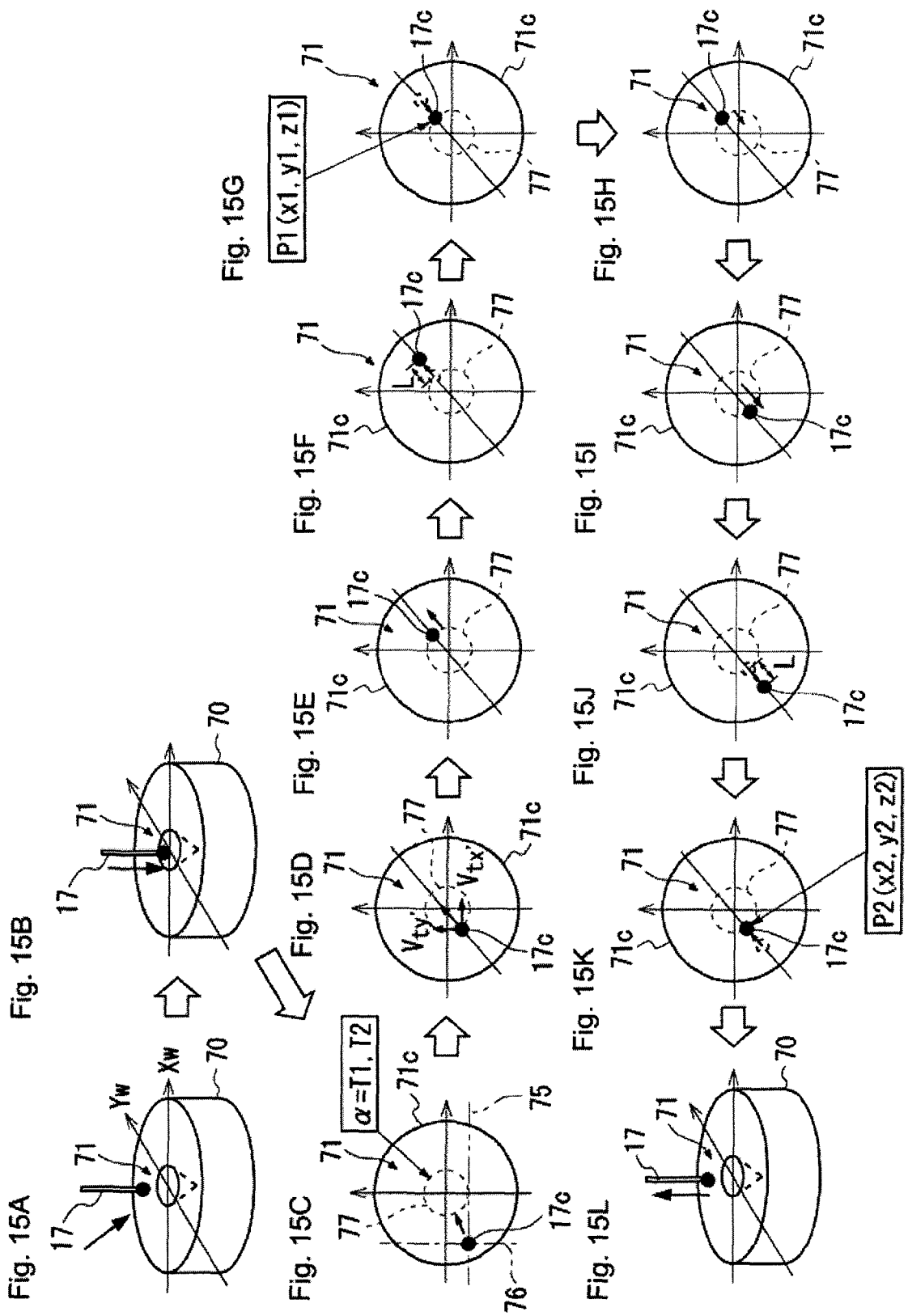

FORM MEASURING APPARATUS AND MEASURING METHOD FOR V GROOVE CENTER

CROSS-REFERENCE TO RELATED APPLICATIONS

The present application claims priority under 35 U.S.C. §119 of Japanese Application No. 2013-174569, filed on Aug. 26, 2013, the disclosure of which is expressly incorporated by reference herein in its entirety.

BACKGROUND OF THE INVENTION

1. Field of the Invention

The present invention relates to a form measuring apparatus and a measurement method of finding a V groove center.

2. Description of Related Art

Scanning measurement by a coordinate measuring machine can be classified into autonomous scanning measurement, in which a scanning movement path is unknown, and nominal scanning measurement, in which a scanning movement path is known. Autonomous scanning measurement includes fixed height scanning measurement, which has as a condition that a center of a stylus tip of a scanning probe is confined to a constraint plane of a predetermined height. A scanning measuring apparatus performing fixed-height scanning measurement is disclosed in Japanese Patent Laid-open Publication No. 2005-345123, for example.

Meanwhile, Japanese Patent Laid-open Publication No. 2010-014638 discloses a V groove shape measuring method suitable for use when measuring a characteristic value (such as a pitch deviation or a diameter deviation) of a V groove formed in a spiral shape. In the V groove shape measuring method, a center of the V groove formed in the spiral shape on a work piece is found. A contra-approach direction vector perpendicular to a work piece center axis is found, and a probe is moved from a current position in an approach direction such that a stylus tip of the probe makes contact with one inclined surface of the V groove. Here, the approach direction is a direction opposite that of the contra-approach direction vector. Thereafter, the probe is moved such that the stylus tip scans along the inclined surface. When an angle created by the contra-approach direction vector and a probe normal line vector is within a predetermined value, a determination is made that the stylus tip is in a state of contact with two inclined surfaces of the V groove, and coordinate values for the stylus tip at that point are obtained as a measured value for the V groove center.

SUMMARY OF THE INVENTION

However, the inventors of the present invention have discovered that measurement accuracy in the above-noted measurement method of finding the V groove center can be improved. Accordingly, the present invention provides a form measuring apparatus and a measurement method of finding a V groove center which are capable of measuring the V groove center with a high degree of accuracy.

A form measuring apparatus according to one aspect of the present invention includes a probe, a driver, a probe coordinate detector, a deflection vector detector, an angle calculator, a tip coordinate calculator, a controller, a threshold value-correspondent coordinate obtainer, and a V groove center calculator. The probe includes a tip for measuring a measured object. The driver moves the probe. The probe coordinate detector detects coordinates of the probe. The deflection vector detector detects a deflection vector of the probe. The angle calculator calculates an angle created between a direction of the deflection vector and a predetermined direction. The tip coordinate calculator calculates the coordinates of the tip based on the coordinates and the deflection vector of the probe. The controller executes a first scanning control, causing the driver to move the probe such that the tip scans along an inclined surface of a V groove to approach a center of the V groove, and a second scanning control, causing the driver to move the probe such that the tip scans along the inclined surface of the V groove to approach the center of the V groove from a side opposite that of the first scanning control. The threshold value-correspondent coordinate obtainer obtains, as first coordinates, coordinates of the tip where the angle has changed to exceed a first threshold value during execution of the first scanning control and obtains, as second coordinates, coordinates of the tip where the angle has changed to exceed a second threshold value during execution of the second scanning control. The V groove center calculator calculates coordinates of the V groove center based on the first coordinates and the second coordinates.

The controller preferably executes a third scanning control before executing the first scanning control, the third scanning control causing the driver to move the probe such that the tip scans along the inclined surface of the V groove to move away from the V groove center, and, in the third scanning control, preferably causes the driver to move the probe until a movement distance of the tip from a position where the angle reached the first threshold value reaches a predetermined length. The controller also preferably executes a fourth scanning control before executing the second scanning control, the fourth scanning control causing the driver to move the probe such that the tip scans along the inclined surface of the V groove to move away from the V groove center, and, in the fourth scanning control, preferably causes the driver to move the probe until the moving distance of the tip from a position where the angle reached the second threshold value reaches a predetermined length.

In the first and second scanning controls, the controller preferably executes a fixed-height scanning control, where a fixed plane perpendicular to a length direction of the V groove is defined as a confining surface.

The controller preferably executes a fifth (or further) scanning control causing the driver to move the probe such that the tip scans along the inclined surface of the V groove to approach the V groove center. In the fifth scanning control, the controller generates a first target speed vector of the probe for fixed-height scanning control where a first plane parallel to the predetermined direction is defined as a confining surface; generates a second target speed vector of the probe for fixed-height scanning control where a second plane parallel to the predetermined direction and perpendicular to the first plane is defined as a confining surface; causes the driver to move the probe based on a combined vector of the first target speed vector and the second target speed vector; and detects, as a detected speed component, a component of the tip speed that is perpendicular to the predetermined direction and where the angle has reached one of the first threshold value and the second threshold value. The first plane and the second plane move together with the tip. In the first and second scanning controls, the controller preferably controls a component of the probe speed that is perpendicular to the predetermined direction based on the detected speed component.

A measurement method of finding a V groove center according to another aspect of the present invention obtains, as first coordinates, coordinates of a tip of a probe where an angle created between a deflection direction of the probe and a predetermined direction changes to exceed a first threshold value during a first scanning where the probe is moved such that the tip scans along an inclined surface of a V groove to approach a center of the V groove; obtains, as second coordinates, coordinates of the tip where the angle changes to exceed a second threshold value during a second scanning where the probe is moved such that the tip scans along the inclined surface of the V groove to approach the V groove center from a side opposite that of the first scanning; and calculates coordinates of the V groove center based on the first coordinates and the second coordinates.

Accordingly, the present invention provides a form measuring apparatus and a measurement method of finding a V groove center which are capable of finding the V groove center with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 15A to 15L are schematic views illustrating operations of a probe in the measurement method of finding the V groove center according to the second embodiment.

DETAILED DESCRIPTION OF THE INVENTION

Figure 1:
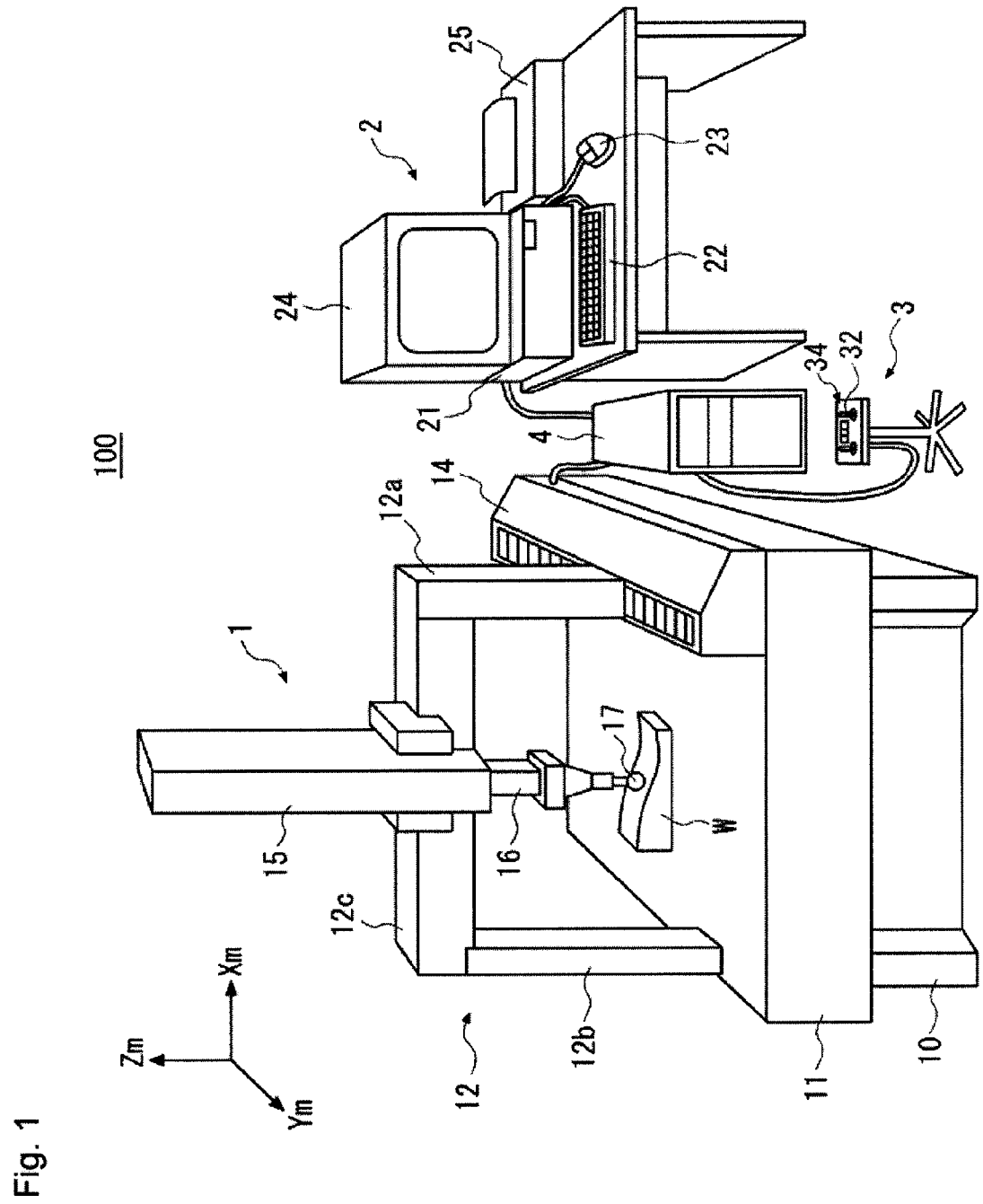
FIG. 1 is a perspective view illustrating an exterior view of a form measuring apparatus according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the plurality of drawings, and duplicative descriptions are omitted where necessary.

First Embodiment

A form measuring apparatus 100 according to a first embodiment is briefly described with reference to FIG. 1.

The form measuring apparatus 100 includes a coordinate measuring machine 1, a computer 2, a joystick box 3, and controller 4. The coordinate measuring machine 1 may also be referred to as a three-dimensional coordinate measuring machine. The coordinate measuring machine 1 measures a work piece W (measured object). The controller 4 execute drive control of the coordinate measuring machine 1. The joystick box 3 is used to manually operate the coordinate measuring machine 1. The computer 2 is used to define measurement/control conditions, to save measurement data, to perform form analysis based on the measurement data, and the like.

A machine coordinate system is defined with respect to the coordinate measuring machine 1. The machine coordinate system includes an Xm axis, a Ym axis, and a Zm axis, which are mutually orthogonal. The Zm axis has a vertical, upward orientation. The coordinate measuring machine 1 includes an anti-vibration table 10, a base 11, a gantry type frame 12, a driving mechanism 14, a column 15, a spindle 16, and a probe 17. The base 11 is installed on top of the anti-vibration table 10 such that a top surface of the base 11 (a base surface) aligns with a horizontal plane. The driving mechanism 14, which extends parallel to the Ym axis, is installed on top of the base 11.

The gantry type frame 12 includes a beam 12c extending parallel to the Xm axis, and beam supports 12a and 12b supporting the beam 12c. The beam support 12a stands upright on top of the driving mechanism 14. The beam support 12b stands upright on top of the base 11. A bottom end of the beam support 12b is supported by an air bearing so as to be capable of moving parallel to the Ym axis. The driving mechanism 14 drives the beam support 12a parallel to the Ym axis. Thereby, the gantry type frame 12 moves parallel to the Ym axis.

The beam 12c supports the column 15, which extends in a vertical direction (Zm axis direction). The column 15 is driven along the beam 12c, parallel to the Xm axis. The column 15 is provided such that the spindle 16 is driven along the column 15 parallel to the Zm axis. The contact-type probe 17 is mounted to a bottom end of the spindle 16. The probe 17 may also be referred to as a copying probe. The coordinate measuring machine 1 performs measurement of the work piece W using the probe 17. Details of the probe 17 will be described hereafter.

The computer 2 includes a computer main body 21, a keyboard 22, a mouse 23, a monitor 24, and a printer 25. Generic versions of the computer main body 21, keyboard 22, mouse 23, monitor 24, and printer 25 can be used, and so a detailed description of each is omitted.

The joystick box 3 includes a joystick 32 as an operator for manually controlling movement of the probe 17, and a coordinate system selection switch 34 selecting a coordinate system for when a movement direction instruction is given. Operating the coordinate system selection switch 34 enables switching between the machine coordinate system defined with respect to the coordinate measuring machine 1 and a work piece coordinate system defined with respect to the work piece W. When the joystick 32 is operated, the probe 17 is driven according to the coordinate system selected by the coordinate system selection switch 34. Details of the controller 4 will be described hereafter.

Figure 2:
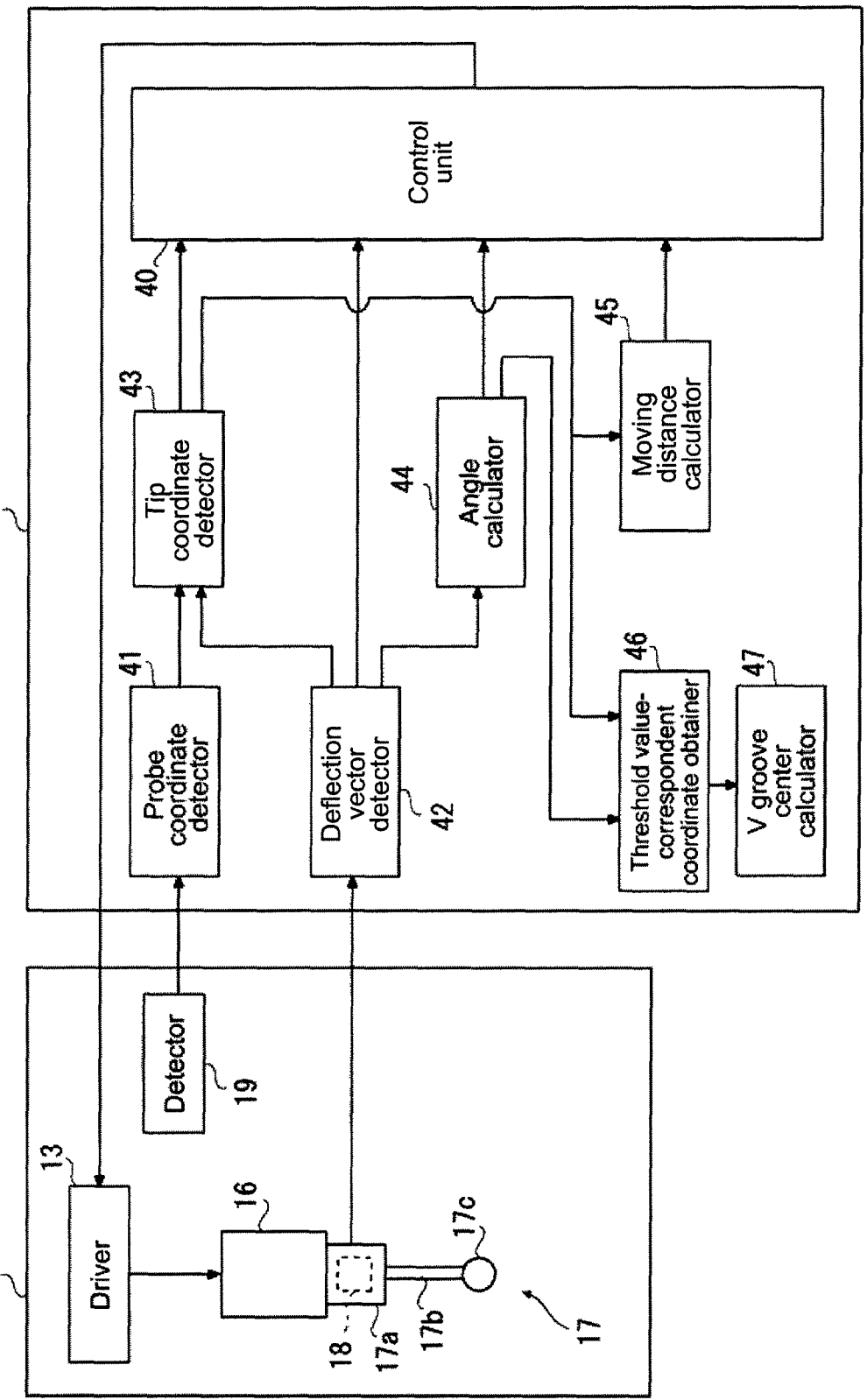
FIG. 2 is a block diagram schematically illustrating configurations of a coordinate measuring device and controls according to the first embodiment.

A detailed description of the configurations of the coordinate measuring machine 1 and the controller 4 is given with reference to FIG. 2.

The coordinate measuring machine 1 includes a driver 13, and detection devices 18 and 19. The driver 13 includes the driving mechanism 14. The driver 13 drives the spindle 16 parallel to each of the Xm axis, the Ym axis, and the Zm axis based on a control signal from the controller 4. The detection device 19 detects movement of the spindle 16 parallel to each of the Xm axis, the Ym axis, and the Zm axis, and outputs a detection result to the controller 4.

The probe 17 includes a probe main body 17a mounted to the spindle 16, a stylus 17b supported by the probe main body 17a, and a tip 17c provided to an end of the stylus 17b. The tip 17c is formed in a spherical shape, for example. The tip 17c may also be referred to as a tip ball, a stylus head, or a contact piece. The probe main body 17a supports the stylus 17b such that the stylus 17b is capable of movement in the three axis directions, and also biases the stylus 17b such that a position of a center of the tip 17c relative to the probe main body 17a returns to a reference position. Accordingly, the center of the tip 17c is positioned at the reference position in a state where the tip 17c does not contact the work piece W, and the center of the tip 17c moves from the reference position in a state where the tip 17c contacts the work piece W. The detection device 18 detects the movement (deflection) of the center of the tip 17c from the reference position and outputs the detection result to the controller 4.

The controller 4 include a control unit 40, a probe coordinate detector 41, a deflection vector detector 42, a tip coordinate calculator 43, an angle calculator 44, a moving distance calculator 45, a threshold value-correspondent coordinate obtainer 46, and a V groove center calculator 47. The control unit 40, the probe coordinate detector 41, the deflection vector detector 42, the tip coordinate calculator 43, the angle calculator 44, the moving distance calculator 45, the threshold value-correspondent coordinate obtainer 46, and the V groove center calculator 47 may be provided as dedicated circuits, and may also be achieved by a CPU (Central Processing Unit, not shown in the drawings) executing a computer program stored in a storage device not shown in the drawings.

In a case where the coordinate measuring machine 1 is manually operated, the control unit 40 generates a control signal based on output from the joystick box 3 and outputs the control signal to the driver 13. In a case where automatic scanning control of the coordinate measuring machine 1 is executed, the control unit 40 generates a control signal based on output from the detection devices 18 and 19 and outputs the control signal to the driver 13.

The probe coordinate detector 41 detects coordinates of the probe 17 as a vector S, based on the output of the detection device 19. The vector S indicates coordinates of the reference position of the probe 17 on the work piece coordinate system. The vector S is represented by the following formula.

[Formula 1]

$$\vec{S} = (x, y, z) \qquad (1)$$

The deflection vector detector 42 detects a deflection vector E of the probe 17 on the work piece coordinate system, based on the output of the detection device 18. The deflection vector E is represented by the following formula. The deflection vector E may also be referred to as a push-in vector or a movement vector.

[Formula 2]

$$\vec{E} = (E_x, E_y, E_z) \qquad (2)$$

The tip coordinate calculator 43 calculates the vector C, which indicates the coordinates of the tip 17c, based on the vector S (which indicates the coordinates of the probe 17) and the probe deflection vector E. The vector C indicates the coordinates of the center of the tip 17c on the work piece coordinate system. The vector C is represented by the following formula.

[Formula 3]

$$\vec{C} = \vec{S} + \vec{E} = (x + E_x, y + E_y, z + E_z) \qquad (3)$$

The moving distance calculator 45 calculates a tip moving distance (distance the tip 17c moves in a state of contact with the work piece W) based on the vector C, which indicates the coordinates of the tip 17c. The angle calculator 44 calculates an angle α created between a direction of the deflection vector E and a predetermined direction in a case where the tip 17c is in contact with the work piece W. Operations of the threshold value-correspondent coordinate obtainer 46 and the V groove center calculator 47 are described hereafter.

Figure 3:
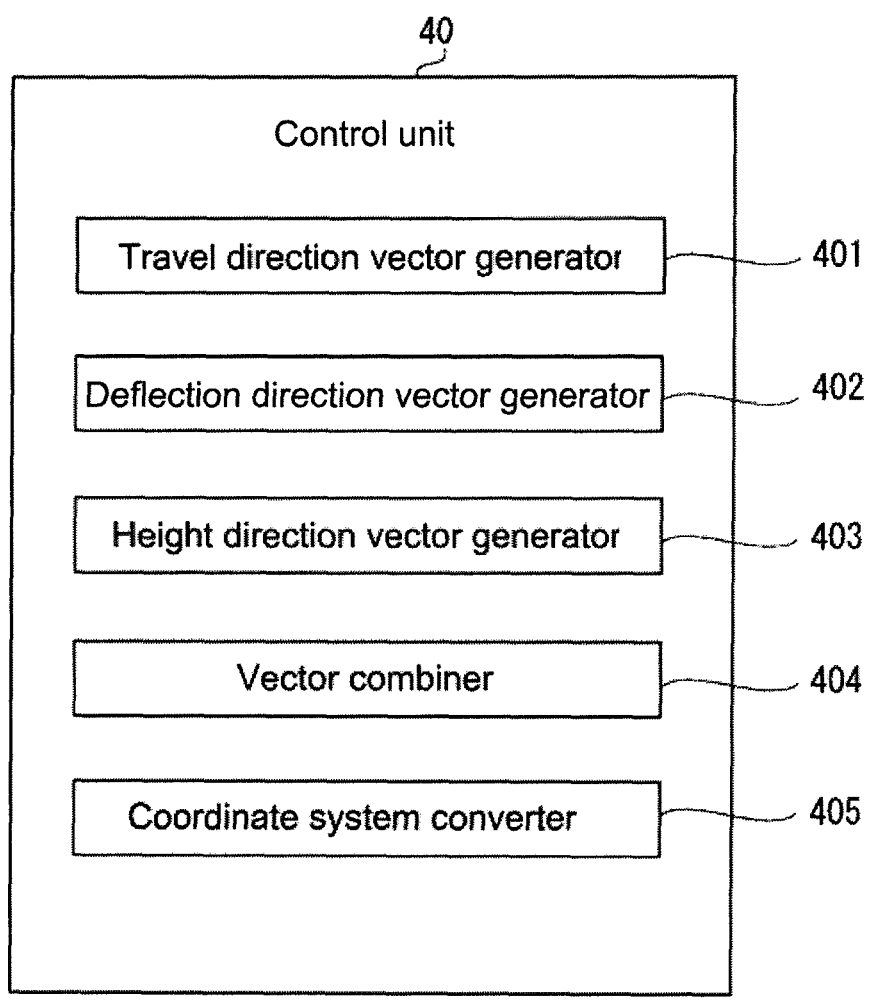
FIG. 3 is a block diagram schematically illustrating a configuration of a controller according to the first embodiment.

With reference to FIG. 3, the control unit 40 includes a travel direction vector generator 401, a deflection direction vector generator 402, a height direction vector generator 403, a vector combiner 404, and a coordinate converter 405.

Hereafter, fixed-height scanning control executed by the form measuring apparatus 1 is described.

Figure 4:
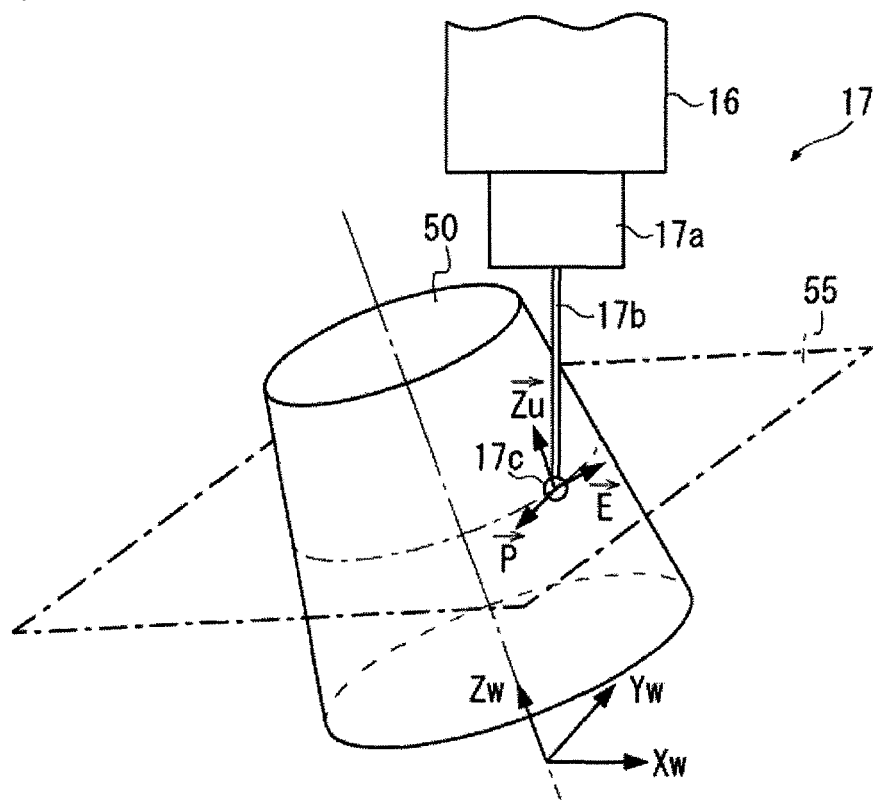
FIG. 4 is a schematic view describing fixed-height scanning control.

With reference to FIG. 4, the work piece coordinate system is defined with respect to a work piece 50 (the work piece W). The work piece coordinate system includes an Xw axis, a Yw axis, and a Zw axis, which are mutually orthogonal. Herein, fixed-height scanning control is described in which a plane 55 perpendicular to the Zw axis is a confining surface. The deflection vector E is a vector in a push direction relative to the work piece 50, and the direction of the deflection vector E substantially aligns with a direction of a normal line for a surface of the work piece W at a point of contact between the work piece 50 and the tip 17c. The travel direction vector generator 401 calculates a scanning travel direction vector P based on a Zw axis unit vector $Z_u$ and the deflection vector E. As shown in the following formula, the scanning travel direction vector P is a vector product of the deflection vector E and the unit vector Z.

[Formula 4]

$$\vec{P} = \vec{E} \times \vec{Z}_u \qquad (4)$$

The travel direction vector generator 401 calculates a normalized vector $P_u$ by normalizing the scanning travel direction vector P. The normalized vector $P_u$ is represented by the following formula.

[Formula 5]

$$\vec{P}_u = \vec{P}/|\vec{P}| \quad (5)$$

The travel direction vector generator 401 generates a travel direction speed vector $V_P$ based on the normalized vector $P_u$ and a scanning speed $V_s$. As shown in the following formula, the travel direction speed vector $V_P$ is a product of the scanning speed $V_s$ and the normalized vector $P_u$.

[Formula 6]

$$\vec{V}_P = V_s \cdot \vec{P}_u \quad (6)$$

The scanning speed $V_s$ is represented by the following formula.

[Formula 7]

$$V_s = f(||\vec{E}| - E_0|, |C_h - Z_h|) \quad (7)$$

Specifically, the larger an absolute value of a difference between the absolute value of the deflection vector E and a predetermined reference deflection amount $E_0$ becomes, the smaller the scanning speed $V_s$ becomes. Moreover, the larger an absolute value of a difference between a current Zw coordinate value $C_h$ for the center of the tip 17c and a Zw coordinate value $Z_h$ for the plane 55 (the confining surface) becomes (in other words, the larger the distance between the center of the tip 17c and the plane 55 becomes), the smaller the scanning speed $V_s$ becomes. The value $C_h$ is a Zw component of the vector C, which indicates the current center coordinates of the tip 17c.

The deflection direction vector generator 402 calculates a normalized vector $E_u$ by normalizing the deflection vector E. The normalized vector $E_u$ is represented by the following formula.

[Formula 8]

$$\vec{E}_u = \vec{E}/|\vec{E}| \quad (8)$$

The deflection direction vector generator 402 generates a deflection direction speed vector $V_E$ based on the normalized vector $E_u$, a predetermined deflection direction speed $V_e$, the absolute value of the deflection vector E, and the predetermined reference deflection amount $E_0$. The deflection direction speed vector $V_E$ is represented by the following formula.

[Formula 9]

$$\vec{V}_E = V_e \cdot (|\vec{E}| - E_0) \cdot \vec{E}_u \quad (9)$$

The height direction vector generator 403 calculates a vector $H_u$ based on the normalized vector $P_u$ and the normalized vector $E_u$. As shown in the following formula, the vector $H_u$ is the vector product of the normalized vector $P_u$ and the normalized vector $E_u$.

[Formula 10]

$$\vec{H}_u = \vec{P}_u \times \vec{E}_u \quad (10)$$

The height direction vector generator 403 calculates a vector $H_h$ based on the vector $H_u$ and the unit vector $Z_u$. As shown in the following formula, the vector $H_h$ is a product of the vector $H_u$ and the reciprocal of a scalar product of the vector $H_u$ and the unit vector $Z_u$.

[Formula 11]

$$\vec{H}_h = \frac{1}{(\vec{H}_u, \vec{Z}_u)} \cdot \vec{H}_u \quad (11)$$

Accordingly, a length over which the vector $H_h$ is projected onto the Zw axis is 1.

The height direction vector generator 403 generates a height direction speed vector $V_H$ based on a predetermined height direction speed $V_h$, the current Zw coordinate value $C_h$ for the center of the tip 17c, the Zw coordinate value $Z_h$ for the plane 55 (the confining surface), and the vector $H_h$. The height direction speed vector $V_H$ is represented by the following formula.

[Formula 12]

$$\vec{V}_H = V_h \cdot (C_h - Z_h) \cdot \vec{H}_h \quad (12)$$

The vector combiner 404 generates a combined speed vector $V_C$ by creating a combination of the travel direction speed vector $V_P$, the deflection direction speed vector $V_E$, and the height direction speed vector $V_H$. The combined speed vector $V_C$ is represented by the following formula.

[Formula 13]

$$\vec{V}_C = \vec{V}_P + \vec{V}_E + \vec{V}_H \quad (13)$$

The coordinate system converter 405 converts the combined speed vector $V_C$ in the work piece coordinate system into an output speed vector $V_M$ in the machine coordinate system. The output speed vector $V_M$ is represented by the following formula.

[Formula 14]

$$\vec{V}_M = (V_X, V_Y, V_Z) \quad (14)$$

The control unit 40 controls the driver 13 based on the output speed vector $V_M$.

The computer main body 21 saves the vector C (which indicates the coordinates of the center of the tip 17c) as measurement data each time the tip moving distance (calculated by the moving distance calculator 45) is increased by a predetermined measurement pitch. The computer main body 21 performs form analysis based on the measurement data. An output apparatus, such as the monitor 24 or the printer 25, outputs measurement data and form analysis results. In addition, the computer main body 21 saves the measurement/control conditions defined using an input apparatus such as the keyboard 22 or the mouse 23, and outputs the measurement/control conditions to the controller 4. Examples of the measurement/control conditions include the measurement pitch, the reference deflection amount $E_0$, the deflection direction speed $V_e$, the height direction speed $V_h$, and data defining the confining surface.

Next, a description is given of a measurement method of finding a V groove center according to the first embodiment. The measurement method of finding the V groove center according to the first embodiment is preferably applied to a measurement of the center of a V groove formed in a spiral shape or a V groove formed in a straight line shape. Hereafter, an exemplary case is described in which the V groove has a spiral shape.

Figure 5:
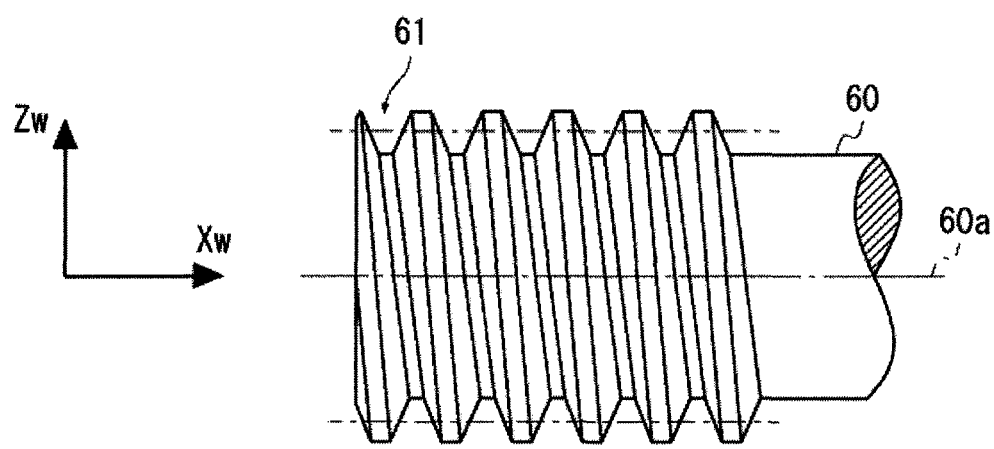
FIG. 5 is a front view of a work piece on which a measurement finding a V groove center according to the first embodiment is performed.

A description is given, with reference to FIG. 5, of a work piece on which the measurement finding the V groove center is performed. A work piece 60 (the work piece W) is a threaded shaft of a ball screw. A V groove 61 is formed in a spiral shape on the work piece 60, the center of the V groove 61 being a shaft core 60a of the work piece 60. The work piece coordinate system is defined with respect to the work piece 60. The work piece coordinate system includes the Xw axis, the Yw axis, and the Zw axis, which are mutually orthogonal. The Xw axis aligns with the shaft core 60a. The work piece 60 is preferably positioned on the base 11 such that the Xw axis, the Yw axis, and the Zw axis are substantially parallel to the Xm axis, the Ym axis, and the Zm axis, respectively.

Figure 6:
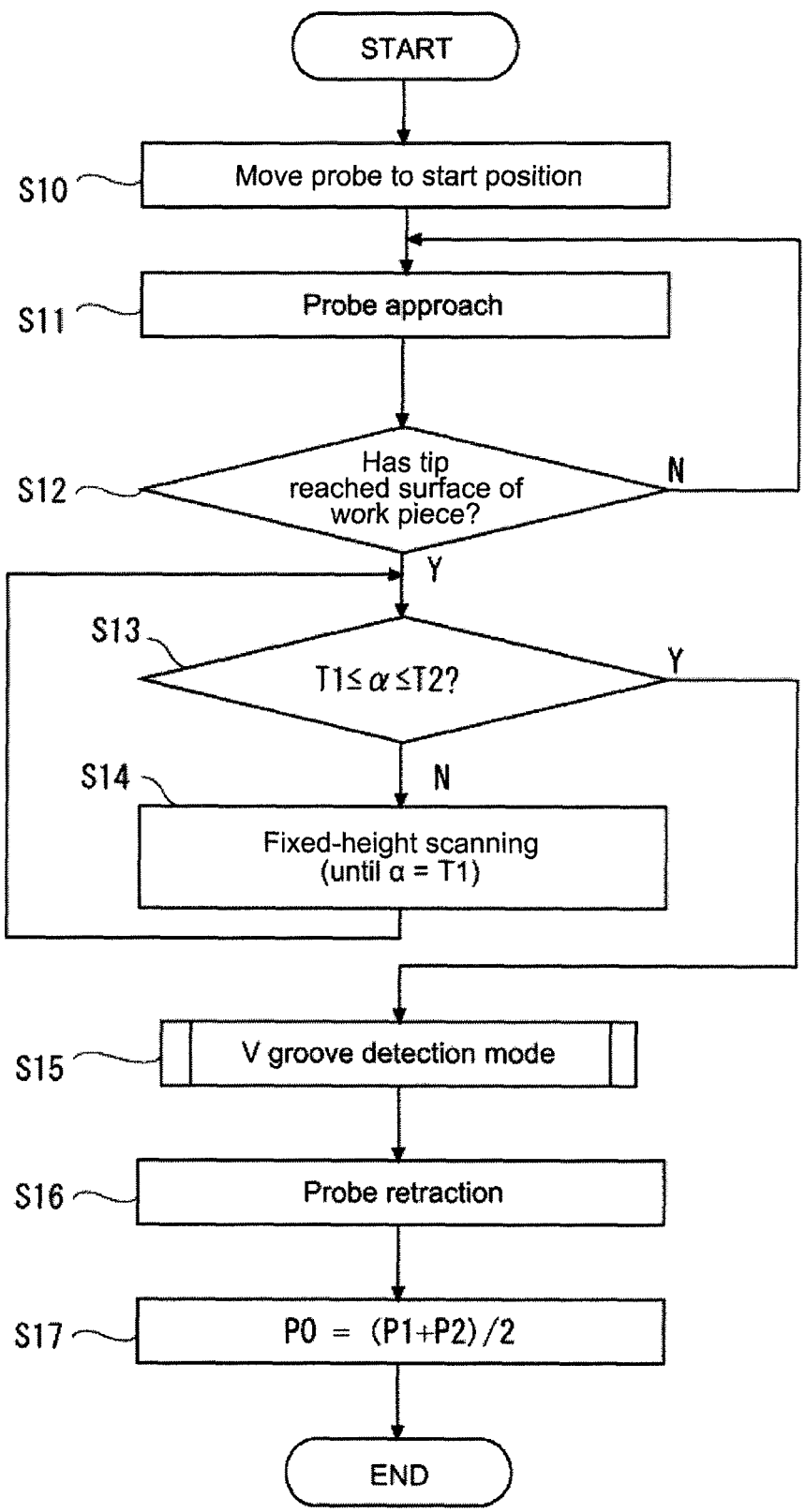
FIG. 6 is a flow chart illustrating a measurement method of finding the V groove center according to the first embodiment.
Figure 7:
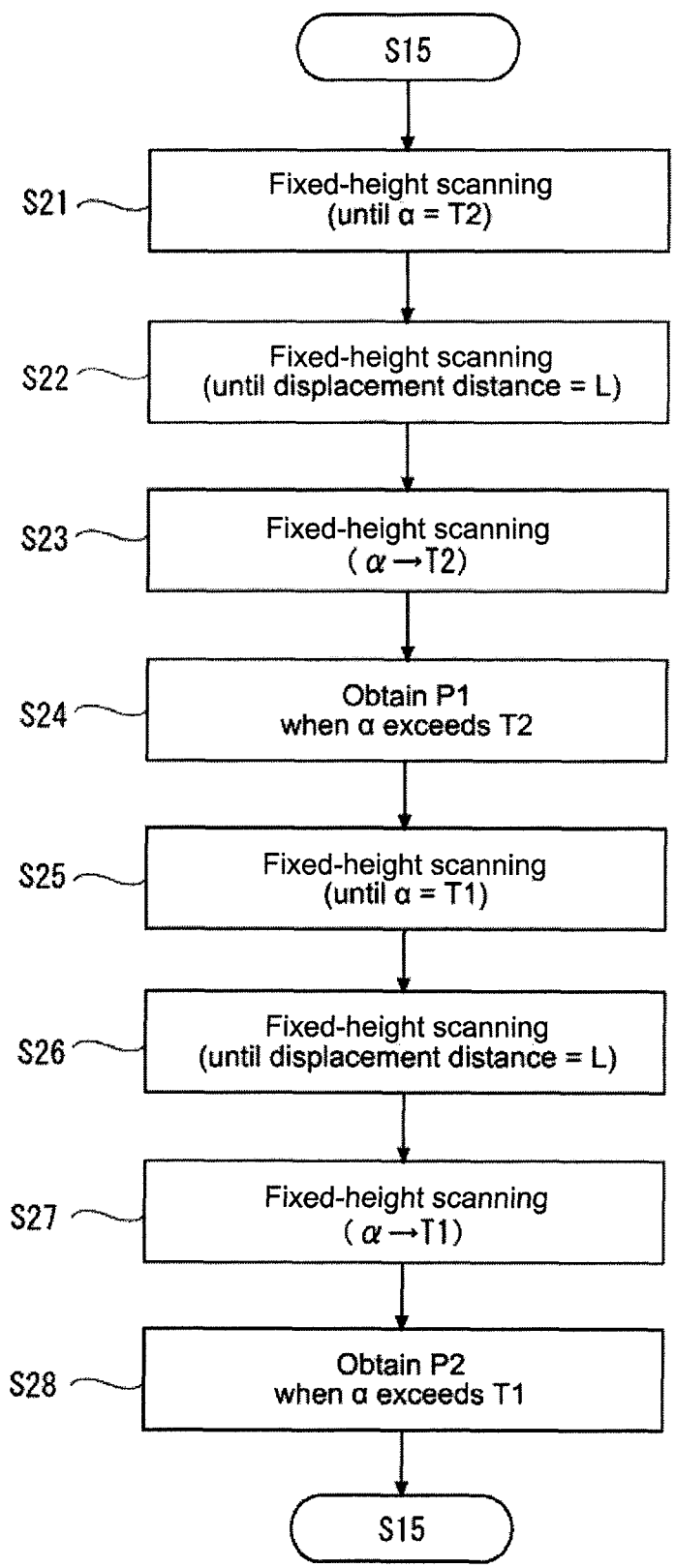
FIG. 7 is a flow chart illustrating a V groove detection mode according to the first embodiment.

With reference to FIG. 6, the measurement method of finding the V groove center according to the first embodiment includes steps S10 to S17. With reference to FIG. 7, a V groove detection mode (step S15) includes steps S21 to S28.

(Steps S10 and S11)

Figure 8:
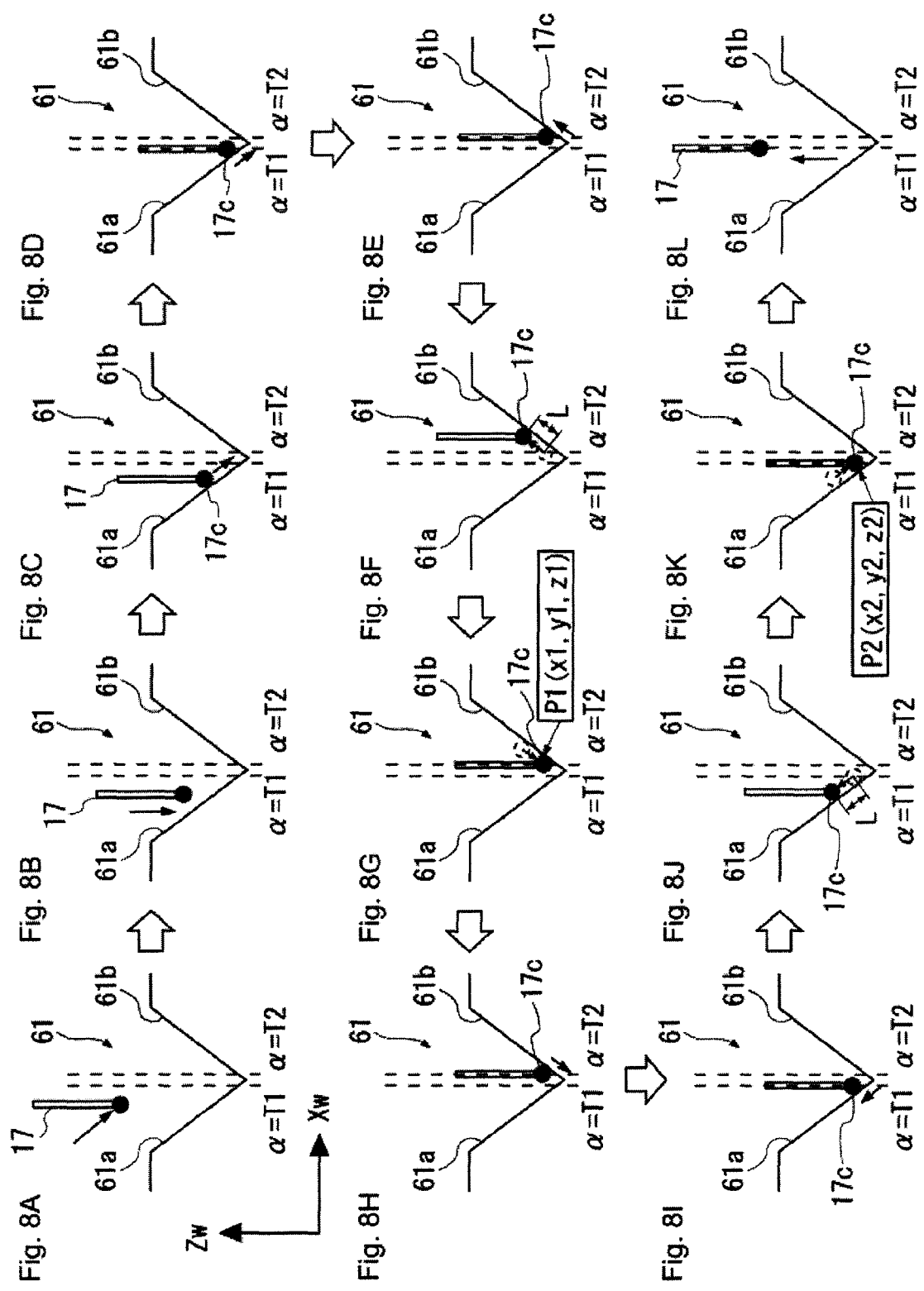
FIGS. 8A to 8L are schematic views illustrating operations of a probe in the measurement method of finding the V groove center according to the first embodiment.

FIGS. 8A to 8L are schematic views illustrating operations of the probe 17 in the measurement method of finding the V groove center according to the first embodiment. As shown in FIG. 8A, the control unit 40 causes the driver 13 to move the probe 17 from a current position to a start position above the V groove 61 (step S10). The start position is, for example, a point on an XwZw plane (a plane defined by the Xw axis and the Zw axis). As shown in FIG. 8B, the control unit 40 causes the driver 13 to make the probe 17 approach a surface of the V groove 61 (step S11). At this time, the driver 13 moves the probe 17 so as to run parallel to the Zw axis.

(Step S12)

The control unit 40 determines whether the tip 17c has reached the surface of the work piece 60. Specifically, the control unit 40 determines that the tip 17c has reached the surface of the work piece 60 when the absolute value of the deflection vector E becomes larger than a contact determination threshold value (YES in step S12), then causes the driver 13 to stop the probe 17 and the process proceeds to step S13. In a case where the absolute value of the deflection vector E is not larger than the contact determination threshold value (NO in step S12), the process returns to step S11.

Figure 9:
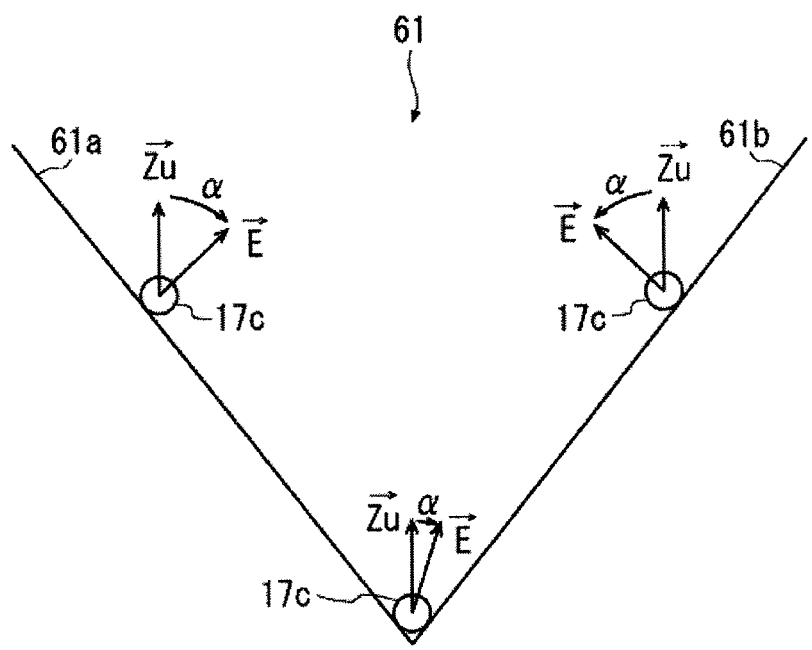
FIG. 9 is a schematic view illustrating an angle formed between a direction of a deflection vector of the probe and a predetermined direction.

A description is given, with reference to FIG. 9, of the angle α created between a direction of the deflection vector E and a predetermined direction. FIG. 9 illustrates a case where the tip 17c on the XwZw plane is in contact with at least one of inclined surfaces 61a and 61b of the V groove 61. Herein, the predetermined direction aligns with the Zw axis direction. The angle calculator 44 calculates the angle α based on the deflection vector E and the Zw axis unit vector $Z_u$. The angle α is approximately 0° in a case where the tip 17c is in contact with both the inclined surface 61a and the inclined surface 61b. The angle α has a negative sign in a case where the tip 17c is in contact with only the inclined surface 61a, and has a positive sign in a case where the tip 17c is in contact with only the inclined surface 61b. The absolute value of the angle α in a case where the tip 17c is in contact with only one of the inclined surfaces 61a and 61b is larger than the absolute value of the angle α in a case where the tip 17c is in contact with both of the inclined surfaces 61a and 61b.

(Step S13)

The control unit 40 determines whether the angle α is between two threshold values, T1 and T2. An example of the threshold value T1 is −0.5°, while an example of the threshold value T2 is +0.5°. Accordingly, the control unit 40 can determine whether the tip 17c is in contact with both of the inclined surfaces 61a and 61b. Hereafter, a case is described where, when the tip 17c has reached the inclined surface 61a due to the approach of step S11 and the probe 17 has stopped in step S12, the value of the angle α is smaller than the threshold value T1. Because the angle α is smaller than the threshold value T1 (NO in step S13), the process advances to step S14.

(Step S14)

The control unit 40 executes a fixed-height scanning control, in which the XwZw plane is defined as the confining surface, until the angle α reaches the threshold value T1. The fixed-height scanning control in which the XwZw plane is defined as the confining surface is basically similar to the fixed-height scanning control described using formulae (4) to (14). However, an orientation of the travel direction speed vector $V_P$ is determined such that the angle α increases, using a Yw axis unit vector instead of the Zw axis unit vector; using a Yw coordinate value for the center of the tip 17c instead of the Zw coordinate value $C_h$ for the center of the tip 17c; and using the Yw coordinate value (=0) of the XwZw plane instead of the Zw coordinate value $Z_h$ of the plane 55. Thereby, as shown in FIG. 8C, the control unit 40 causes the driver 13 to move the probe 17 such that the tip 17c scans along the inclined surface 61a to approach the center (bottom) of the V groove 61. When the tip 17c scans along the inclined surface 61a to approach the center of the V groove 61, a point of contact between the tip 17c and the inclined surface 61a approaches the center of the V groove 61. As shown in FIG. 8D, when the angle α reaches the threshold value T1 (YES in step S13), the process advances to step S15. As noted above, step S15 includes the steps S21 through S28. Moreover, when the angle α is equal to the threshold value, the tip 17c contacts both of the inclined surfaces 61a and 61b, as in the depiction of the bottom of the V groove 61 in FIG. 9. However, in order to facilitate understanding, the tip 17c is treated as being in contact with only one side in FIG. 8D. A case below where the angle α is equal to the threshold value is depicted in a similar manner.

(Step S21)

The control unit 40 executes the fixed-height scanning control, in which the XwZw plane is defined as the confining surface, until the angle α reaches the threshold value T2. The fixed-height scanning control in step S21 is similar to the fixed-height scanning control in step S14. Thus, as shown in FIG. 8D, the control unit 40 causes the driver 13 to move the probe 17 such that the tip 17c scans along the inclined surface 61a to approach the center of the V groove 61 and, as shown in FIG. 8E, the control unit 40 causes the driver 13 to move the probe 17 such that the tip 17c scans along the inclined surface 61b to move away from the center of the V groove 61. When the tip 17c scans along the inclined surface 61b to move away from the center of the V groove 61, the point of contact between the tip 17c and the inclined surface 61b moves away from the center of the V groove 61.

(Step S22)

The control unit 40 executes the fixed-height scanning control, in which the XwZw plane is defined as the confining surface, until a moving distance of the tip 17c from the position where the angle α reached the threshold value T2 reaches a predetermined length L. The fixed-height scanning control in step S22 is similar to the fixed-height scanning control in step S14. Thus, as shown in FIG. 8F, the control unit 40 causes the driver 13 to move the probe 17 such that the tip 17c scans along the inclined surface 61b to move away from the center of the V groove 61 and causes the driver 13 to stop the probe 17 when the moving distance of the tip 17c from the position where the angle α reached the threshold value T2 reaches the predetermined length L.

(Step S23)

The control unit 40 executes the fixed-height scanning control, in which the XwZw plane is defined as the confining surface, such that the angle α approaches the threshold value T2. The fixed-height scanning control in step S23 is basically similar to the fixed-height scanning control in step S14. However, an orientation of the travel direction speed vector $V_P$ is determined such that the angle α decreases. Thereby, as shown in FIG. 8G, the control unit 40 causes the driver 13 to move the probe 17 such that the tip 17c scans along the inclined surface 61b to approach the center of the V groove 61. When the tip 17c scans along the inclined surface 61b to approach the center of the V groove 61, the point of contact between the tip 17c and the inclined surface 61b approaches the center of the V groove 61.

(Step S24)

As shown in FIG. 8G, the threshold value-correspondent coordinate obtainer 46 obtains, as the measured value, coordinates P1 for the tip 17c when the angle α has changed to exceed the threshold value T2. For example, the threshold value-correspondent coordinate obtainer 46 obtains, as the coordinates P1, the vector C where the angle α has changed to exceed the threshold value T2.

(Step S25)

The control unit 40 executes the fixed-height scanning control, in which the XwZw plane is defined as the confining surface, until the angle α reaches the threshold value T1. The fixed-height scanning control in step S25 is similar to the fixed-height scanning control in step S23. Thus, as shown in FIG. 8H, the control unit 40 causes the driver 13 to move the probe 17 such that the tip 17c scans along the inclined surface 61b to approach the center of the V groove 61 and, as shown in FIG. 8I, the control unit 40 causes the driver 13 to move the probe 17 such that the tip 17c scans along the inclined surface 61a to move away from the center of the V groove 61. When the tip 17c scans along the inclined surface 61a to move away from the center of the V groove 61, the point of contact between the tip 17c and the inclined surface 61a moves away from the center of the V groove 61.

(Step S26)

The control unit 40 executes the fixed-height scanning control, in which the XwZw plane is defined as the confining surface, until a moving distance of the tip 17c from the position where the angle α reached the threshold value T1 reaches the predetermined length L. The fixed-height scanning control in step S26 is similar to the fixed-height scanning control in step S23. Thus, as shown in FIG. 8J, the control unit 40 causes the driver 13 to move the probe 17 such that the tip 17c scans along the inclined surface 61a to move away from the center of the V groove 61 and causes the driver 13 to stop the probe 17 when the moving distance of the tip 17c from the position where the angle α reached the threshold value T1 reaches the predetermined length L.

(Step S27)

The control unit 40 executes the fixed-height scanning control, in which the XwZw plane is defined as the confining surface, such that the angle α approaches the threshold value T1. The fixed-height scanning control in step S27 is similar to the fixed-height scanning control in step S14. Thereby, as shown in FIG. 8K, the control unit 40 causes the driver 13 to move the probe 17 such that the tip 17c scans along the inclined surface 61a to approach the center of the V groove 61.

(Step S28)

As shown in FIG. 8K, the threshold value-correspondent coordinate obtainer 46 obtains, as the measured value, coordinates P2 for the tip 17c when the angle α has changed to exceed the threshold value T1. For example, the threshold value-correspondent coordinate obtainer 46 obtains, as the coordinates P2, the vector C where the angle α has changed to exceed the threshold value T1. In step S28, the coordinates of the tip 17c are obtained when the tip 17c approaches the center of the V groove 61 from a side opposite that in step S24.

Thereafter, the control unit 40 causes the driver 13 to stop the movement of the probe 17. After step S28, the process advances to step S16.

(Steps S16 and S17)

As shown in FIG. 8L, the control unit 40 causes the driver 13 to retract the probe 17 (step S16). The V groove center calculator 47 calculates, as the measured value, coordinates P0 for the center of the V groove 61 based on the coordinates P1 and P2 (step S17). For example, as shown in the following formula, the coordinates P0 are the average of the coordinates P1 and P2.

[Formula 15]

$$P0 = (P1 + P2)/2 \tag{15}$$

The computer main body 21 saves the coordinates P0 as measurement data.

Moreover, in a case where, when the tip 17c has reached the inclined surface 61b due to the approach of step S11 and the probe 17 has stopped in step S12, the value of the angle α is larger than the threshold value T2, the threshold value T1 and the threshold value T2 are swapped in step S14 and steps S21 through S28.

In addition, in a case where the angle α where the probe 17 has stopped in step S12 is between the two threshold values T1 and T2, step S14 is not performed. However, other steps are similar to the case where, when the tip 17c has reached the inclined surface 61a due to the approach of step S11 and the probe 17 has stopped in step S12, the value of the angle α is smaller than the threshold value T1.

According to the present embodiment, the coordinates P1 are obtained (step S24) for the tip 17c where the angle α has changed to exceed the threshold value T2 during execution of a first scanning control (step S23) in which the probe 17 is moved such that the tip 17c scans along the inclined surface 61b of the V groove 61 to approach the center of the V groove 61. The coordinates P2 are obtained (step S28) for the tip 17c where the angle α has changed to exceed the threshold value T1 during execution of a second scanning control (step S27) in which the probe 17 is moved such that the tip 17c scans along the inclined surface 61a of the V groove 61 to approach the center of the V groove 61 from a side opposite that of the first scanning control (step S23). The coordinates P0 for the center of the V groove 61 are calculated based on the coordinates P1 and P2 (step S17). The coordinates P0 for the center of the V groove 61 are calculated based on the coordinates P1 obtained when the tip 17c is approaching the center of the V groove 61 and on the coordinates P2 obtained when the tip 17c is approaching the center of the V groove 61 from the opposite side. Therefore, the V groove center can be measured with a high degree of accuracy. In other words, the coordinates P0 are calculated based on the coordinates P1 and P2 obtained, respectively, when the tip 17c is moved from top to bottom across the inclined surfaces of the V groove 61 from two directions. Therefore, the V groove center can be measured with a high degree of accuracy. Furthermore, a method of obtaining the coordinates is uniform such that the coordinates of the tip 17c are obtained when the tip 17c approaches the center of the V groove 61. Therefore, the measured value for the V groove center is unlikely to be influenced by flexure of the stylus 17b, for example, and a degree of accuracy in repeated measurements is high.

Moreover, according to the present embodiment, in step S22, the probe 17 is moved until the moving distance of the tip 17c from the position where the angle α reached the threshold value T2 reaches the predetermined length L, and in step S26, the probe 17 is moved until the moving distance of the tip 17c from the position where the angle α reached the threshold value T1 reaches the predetermined length L. Therefore, the conditions at initiation of steps S23 and S27 are uniform. Accordingly, the degree of accuracy in repeated measurements is high.

Furthermore, according to the present embodiment, in step S15 (steps S21 through S28), fixed-height scanning control is executed in which the ZwXw plane is defined as the confining surface, the ZwXw plane being a fixed plane perpendicular to a length direction of the V groove 61. Accordingly, the measurement method of finding the V groove center according to the present embodiment is preferably applied to a measurement finding the center of a V groove formed in a spiral shape or a V groove formed in a straight line shape.

Second Embodiment

Next, a description is given of a form measuring apparatus and a measurement method of finding a V groove center according to a second embodiment. The form measuring apparatus and the measurement method of finding the V groove center according to the second embodiment are preferably applied to measurement of the center of a V groove formed in a conical shape. In the following, a description of aspects common to both the first and second embodiments may be omitted.

Figure 10:
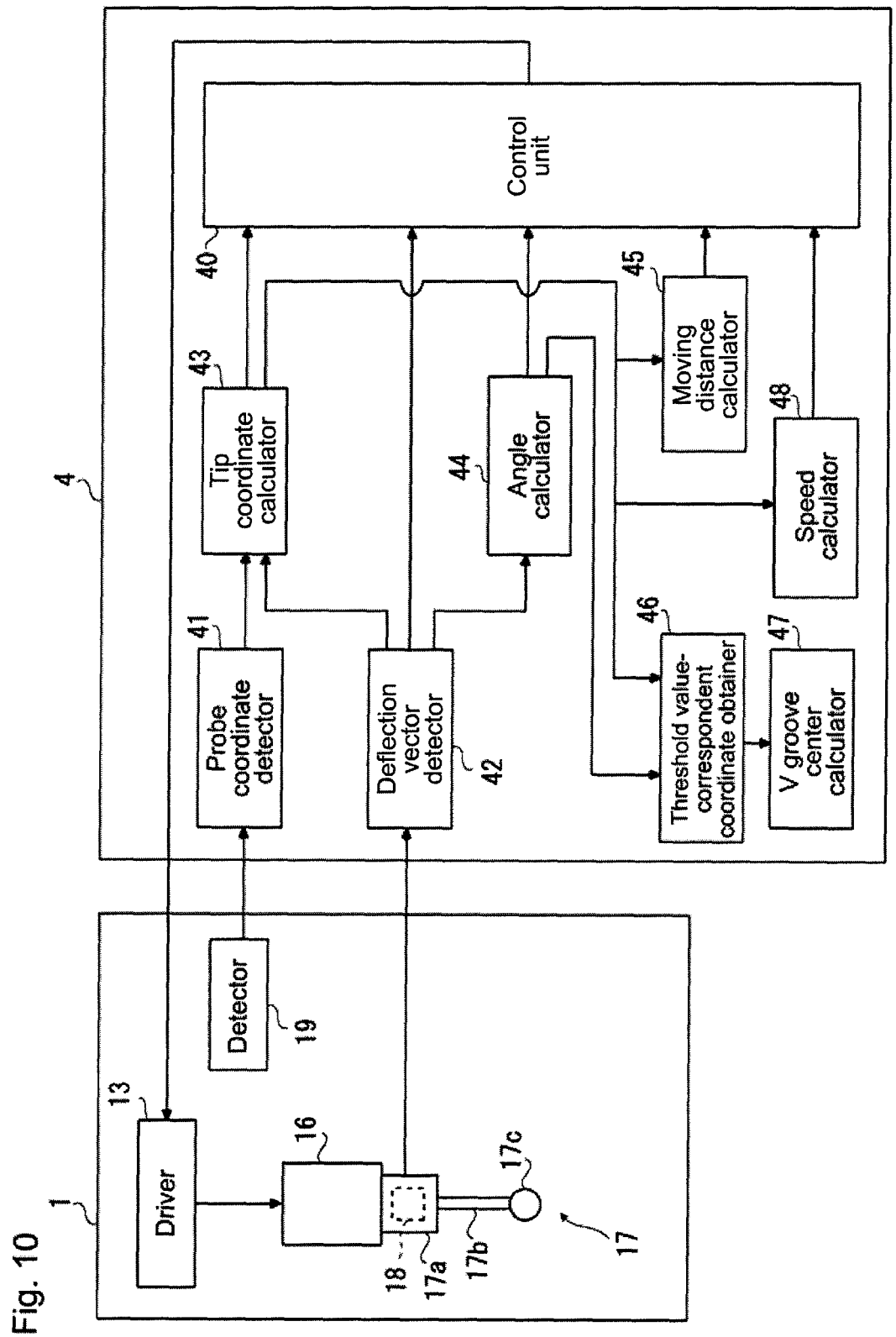
FIG. 10 is a block diagram schematically illustrating configurations of a coordinate measuring device and controls according to a second embodiment.

With reference to FIG. 10, the controller 4 according to the second embodiment include a speed calculator 48, in addition to the configuration of the controller 4 according to the first embodiment. The speed calculator 48 calculates a current speed of the tip 17c based on the vector C, which indicates the coordinates of the tip 17c. The speed calculator 48 may be provided as a dedicated circuit, and may also be achieved by the CPU (not shown in the drawings) executing a computer program stored in a storage device not shown in the drawings.

Figure 11:
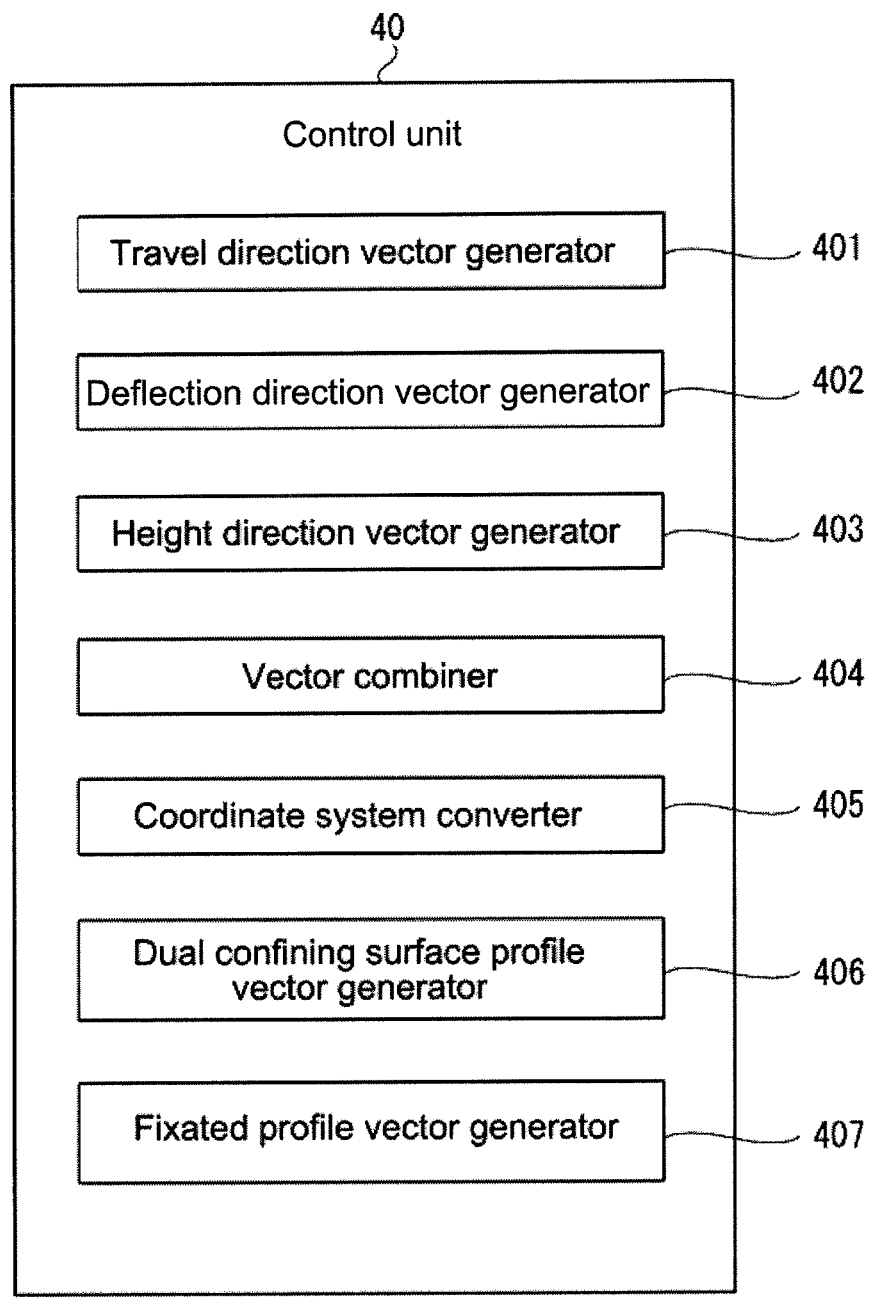
FIG. 11 is a block diagram schematically illustrating a configuration of a controller according to the second embodiment.

With reference to FIG. 11, the control unit 40 according to the second embodiment includes a dual confining surface profile vector generator 406 and a fixated profile vector generator 407, in addition to the configuration of the control unit 40 according to the first embodiment. Operations of the dual confining surface profile vector generator 406 and the fixated profile vector generator 407 are described hereafter.

Figure 12:
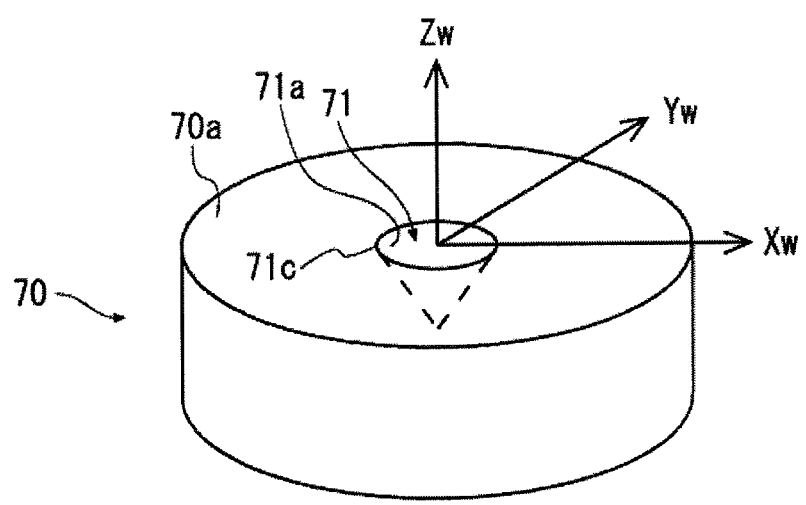
FIG. 12 is a perspective view of a work piece on which a measurement finding a V groove center according to the second embodiment is performed.

A description is given, with reference to FIG. 12, of a work piece on which a measurement finding the V groove center is performed. A conical V groove 71 is formed on a work piece 70 (the work piece W) so as to open into a flat surface 70a. The flat surface 70a is a surface of the work piece 70. An inclined surface 71a of the V groove 71 is formed on a cone surface. The inclined surface 71a and the flat surface 70a intersect at an intersection line 71c. A work piece coordinate system is defined with respect to the work piece 70. The work piece coordinate system includes an Xw axis, a Yw axis, and a Zw axis, which are mutually orthogonal. The Zw axis aligns with a normal line of the flat surface 70a. The work piece 70 is preferably positioned on the base 11 such that the Xw axis, the Yw axis, and the Zw axis are substantially parallel to an Xm axis, a Ym axis, and a Zm axis, respectively.

Figure 13:
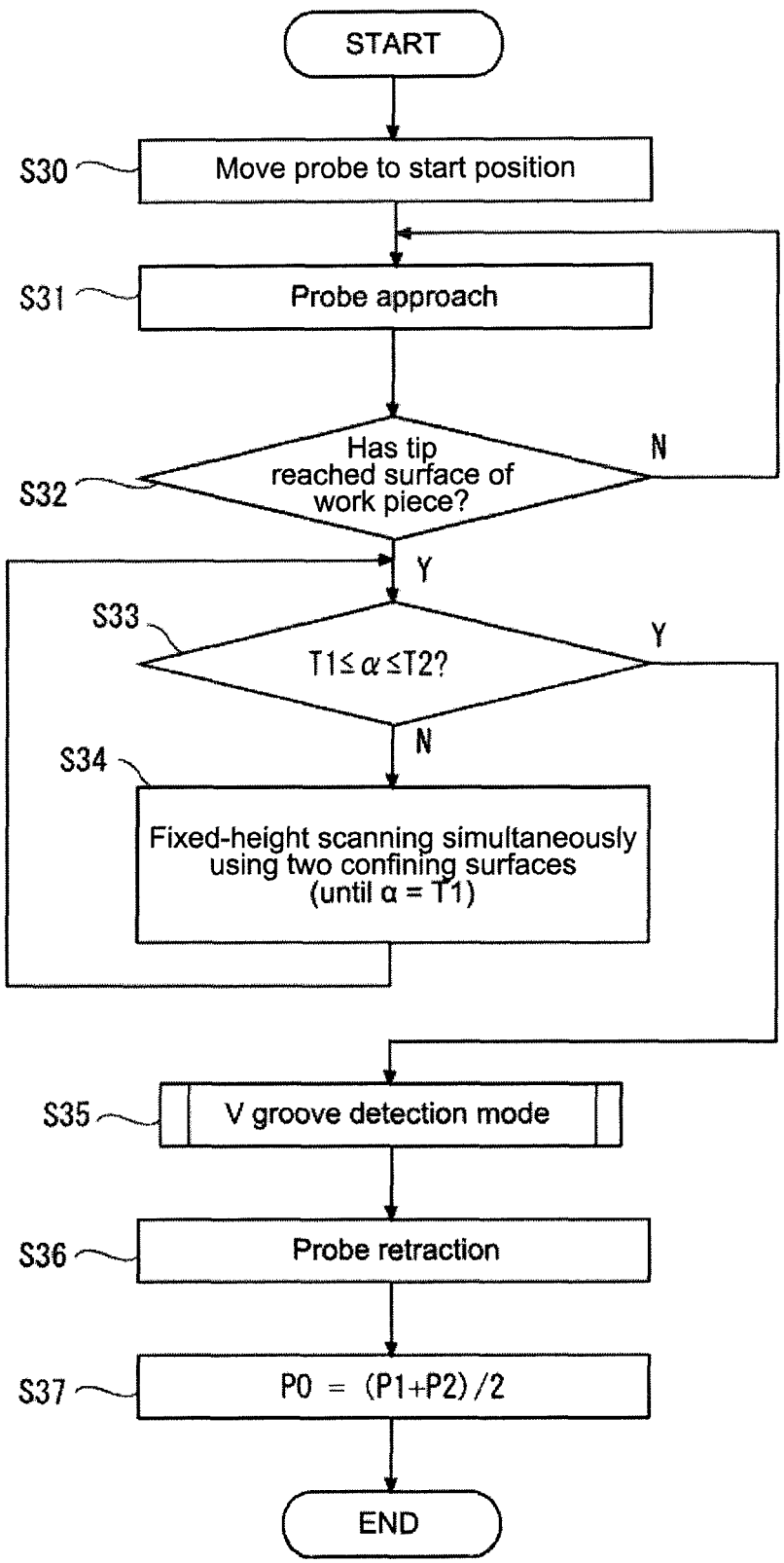
FIG. 13 is a flow chart illustrating a measurement method of finding the V groove center according to the second embodiment.
Figure 14:
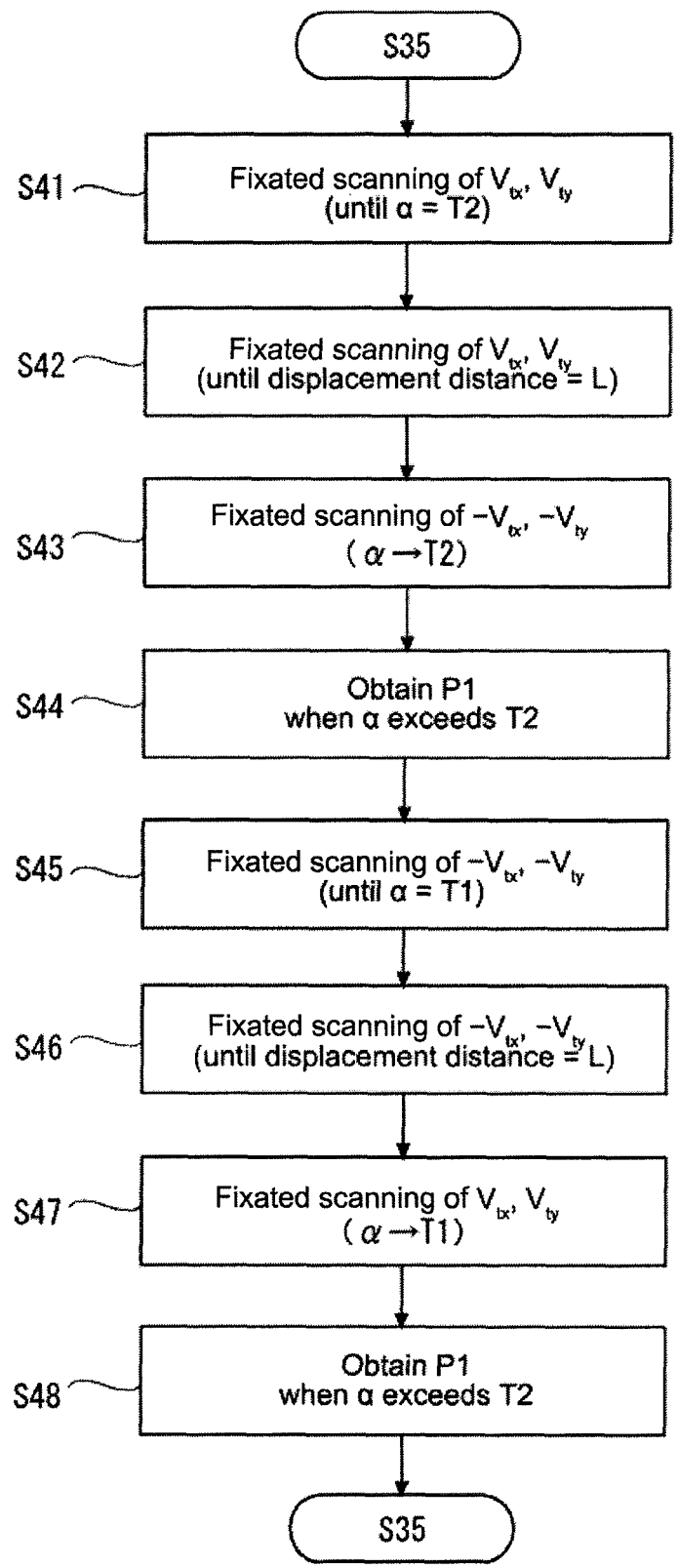
FIG. 14 is a flow chart illustrating a V groove detection mode according to the second embodiment.

With reference to FIG. 13, the measurement method of finding the V groove center according to the second embodiment includes steps S30 to S37. With reference to FIG. 14, a V groove detection mode (step S35) includes steps S41 to S48.

(Steps S30 and S31)

FIGS. 15A to 15L are schematic views illustrating operations of the probe 17 in the measurement method of finding the V groove center according to the second embodiment. As shown in FIG. 15A, the control unit 40 causes the driver 13 to move the probe 17 from a current position to a start position above the V groove 71 (step S30). As shown in FIG. 15B, the control unit 40 causes the driver 13 to approach the probe 17 toward a surface of the V groove 71 (step S31). At this time, the driver 13 moves the probe 17 so to run parallel to the Zw axis.

(Step S32)

The control unit 40 determines whether the tip 17c has reached the surface of the work piece 70. Specifically, the control unit 40 determines that the tip 17c has reached the surface of the work piece 70 when an absolute value of a deflection vector E becomes larger than a contact determination threshold value (YES in step S32), then causes the driver 13 to stop the probe 17 and proceeds to step S33. In a case where the absolute value of the deflection vector E is not larger than the contact determination threshold value (NO in step S32), the process returns to step S31.

(Step S33)

The control unit 40 determines whether an angle α is between two threshold values, T1 and T2, the angle α being created between a direction of the deflection vector E and a predetermined direction (direction of the Zw axis). An example of the threshold value T1 is −0.5°, while an example of the threshold value T2 is +0.5°. Accordingly, the control unit 40 can determine whether the tip 17c is proximate to the center (bottom) of the V groove 71. Hereafter, a case is described where, when the tip 17c has reached the inclined surface 71a due to the approach of step S31 and the probe 17 has stopped in step S32, the value of the angle α is smaller than the threshold value T1. Because the angle α is smaller than the threshold value T1 (NO in step S33), the process advances to step S34.

(Step S34)

With reference to FIG. 15C, until the angle α reaches the threshold value T1, the control unit 40 executes the fixed-height scanning control, in which two planes 75 and 76 are simultaneously defined as the confining surfaces. The plane 75 passes through the center of the tip 17c and is parallel to the Zw and Xw axes. The plane 76 passes through the center of the tip 17c and is parallel to the Zw and Yw axes. The planes 75 and 76 are moved together with the tip 17c. Moreover, a circle 77 on an inner side of the intersection line 71c, which is the line of intersection between the inclined surface 71a and the flat surface 70a, indicates positions where the angle α reaches the threshold value T1 or T2.

Specifically, similar to the case of fixed-height scanning control described above with reference to formulae (4) to (13), the travel direction vector generator 401, the deflection direction vector generator 402, the height direction vector generator 403, and the vector combiner 404 generate a first target speed vector $V_{C1}$ of the probe 17 for the fixed-height scanning control, in which the plane 75 is defined as the confining surface. The first target speed vector $V_{C1}$ corresponds to the combined speed vector $V_C$. However, a Yw axis unit vector is used instead of the Zw axis unit vector; a Yw coordinate value for the center of the tip 17c is used instead of the Zw coordinate value $C_h$ for the center of the tip 17c; and a Yw coordinate value (=Yw coordinate value for the center of the tip 17c) for the plane 75 is used instead of the Zw coordinate value $Z_h$ for the plane 55.

Similarly, the travel direction vector generator 401, the deflection direction vector generator 402, the height direction vector generator 403, and the vector combiner 404 generate a second target speed vector $V_{C2}$ of the probe 17 for the fixed-height scanning control, in which the plane 76 is defined as the confining surface. The second target speed vector $V_{C2}$ corresponds to the combined speed vector $V_C$. However, an Xw axis unit vector is used instead of the Zw axis unit vector; an Xw coordinate value for the center of the tip 17c is used instead of the Zw coordinate value $C_h$ for the center of the tip 17c; and an Xw coordinate value (=Xw coordinate value for the center of the tip 17c) for the plane 76 is used instead of the Zw coordinate value $Z_h$ of the plane 55.

The dual confining surface profile vector generator 406 generates a combined target speed vector $V_{C0}$ by creating a combination of the first target speed vector $V_{C1}$ and the second target speed vector $V_{C2}$. The coordinate system converter 405 converts the combined target speed vector $V_{C0}$ in the work piece coordinate system into an output speed vector $V_{M0}$ in the machine coordinate system. The control unit 40 controls the driver 13 based on the output speed vector $V_{M0}$. Thereby, as shown in FIG. 15C, the control unit 40 causes the driver 13 to move the probe 17 such that the tip 17c scans along the inclined surface 71a to approach the center of the V groove 71. When the tip 17c scans along the inclined surface 71a to approach the center of the V groove 71, a point of contact between the tip 17c and the inclined surface 71a approaches the center of the V groove 71.

Furthermore, in a case where the absolute value of the combined target speed vector $V_{C0}$ is larger than a threshold value, the dual confining surface profile vector generator 406 may also correct the combined target speed vector $V_{C0}$ and generate a corrected target speed vector. A direction of the corrected target speed vector is aligned with a direction of the combined target speed vector $V_{C0}$ and the absolute value of the corrected target speed vector is equal to or less than the threshold value. In such a case, the control unit 40 controls the driver 13 based on the corrected target speed vector.

As shown in FIG. 15D, the control unit 40 detects an Xw component $V_{tx'}$ and a Yw component $V_{ty'}$ of the speed of the tip 17c when the angle α has reached the threshold value T1. $V_{tx'}$ and $V_{ty'}$ are components perpendicular to the Zw axis. Based on $V_{tx'}$, $V_{ty'}$, and a predetermined fixed value F, the control unit 40 determines $V_{tx}$ and $V_{ty}$, which are represented by the following formulae.

[Formula 16]
$$V_{tx} = F \times \frac{V_{tx'}}{\sqrt{V_{tx'}^2 + V_{ty'}^2}} \quad (16)$$

[Formula 17]
$$V_{ty} = F \times \frac{V_{ty'}}{\sqrt{V_{tx'}^2 + V_{ty'}^2}} \quad (17)$$

When the angle α reaches the threshold value T1 (YES in step S33), the process advances to step S35. As noted above, step S35 includes the steps S41 through S48. Moreover, when the angle α is equal to the threshold value, the tip 17c contacts the inclined surface 71a of the V groove 71 at a plurality of points. However, in order to facilitate understanding, the tip 17c is treated as being in contact with only one point in FIG. 15D. A case below where the angle α is equal to the threshold value is depicted in a similar manner.

(Step S41)
The control unit 40 executes fixated scanning control, which is based on $V_{tx}$ and $V_{ty}$, until the angle α reaches the threshold value T2. Here, the fixated profile vector generator 407 generates a target speed vector $V_t$ of the tip 17c, represented by the following formula.

[Formula 18]
$$\vec{V}_t = (V_{tx}, V_{ty}, V_{tz}) \quad (18)$$

The fixated profile vector generator 407 determines a Zw component value $V_{tz}$ of the target speed vector $V_t$ such that the absolute value of the deflection vector E approaches the reference deflection amount $E_0$. Specifically, in the target speed vector $V_t$, the Xw component and the Yw component are fixed to $V_{tx}$ and $V_{ty}$, respectively, and only the Zw component changes. The coordinate converter 405 converts the target speed vector $V_t$ in the work piece coordinate system into an output speed vector $V_{Mt}$ in the machine coordinate system. The control unit 40 controls the driver 13 based on the output speed vector $V_{Mt}$. When the speed of the probe 17 during execution of this control is divided in two, into a vector parallel to the Zw axis and a vector perpendicular to the Zw axis, a magnitude of the vector perpendicular to the Zw axis is constant at the fixed value F, and the direction of the vector perpendicular to the Zw axis is constant in a direction determined by $V_{tx'}$ and $V_{ty'}$.

Thus, while controlling a probe 17 speed component perpendicular to the Zw axis based on $V_{tx}$ and $V_{ty}$, the control unit 40 causes the driver 13 to move the probe 17 such that the tip 17c scans along the inclined surface 71a to approach the center of the V groove 71, as shown in FIG. 15D, and causes the driver 13 to move the probe 17 such that the tip 17c scans along the inclined surface 71a to move away from the center of the V groove 71, as shown in FIG. 15E. When the tip 17c scans along the inclined surface 71a to move away from the center of the V groove 71, the point of contact between the tip 17c and the inclined surface 71a moves away from the center of the V groove 71.

(Step S42)
The control unit 40 executes fixated scanning control, which is based on $V_{tx}$ and $V_{ty}$, until the moving distance of the tip 17c from the position where the angle α reached the threshold value T2 reaches the predetermined length L. The fixated scanning control in step S42 is similar to the fixated scanning control in step S41. Thus, as shown in FIG. 15F, the control unit 40 causes the driver 13 to move the probe 17 such that the tip 17c scans along the inclined surface 71a to move away from the center of the V groove 71, and causes the driver 13 to stop the probe 17 when the moving distance of the tip 17c from the position where the angle α reached the threshold value T2 reaches the predetermined length L.

(Step S43)
The control unit 40 executes fixated scanning control, which is based on $V_{tx}$ and $V_{ty}$, such that the angle α approaches the threshold value T2. The fixated scanning control in step S43 is basically similar to the fixated scanning control in step S41. However, the target speed vector $V_t$ of the tip 17c is represented by the following formula.

[Formula 19]
$$\vec{V}_t = (-V_{tx}, -V_{ty}, -V_{tz}) \quad (19)$$

Specifically, in the target speed vector $V_t$, the Xw component and the Yw component are fixed to $-V_{tx}$ and $-V_{ty}$, respectively, and only the Zw component changes. Thereby, as shown in FIG. 15G, while controlling the probe 17 speed element perpendicular to the Zw axis based on $V_{tx}$ and $V_{ty}$, the control unit 40 causes the driver 13 to move the probe 17 such that the tip 17c scans along the inclined surface 71a to approach the center of the V groove 71.

(Step S44)
As shown in FIG. 15G, the threshold value-correspondent coordinate obtainer 46 obtains, as the measured value, coordinates P1 for the tip 17c when the angle α has changed to exceed the threshold value T2. For example, the threshold value-correspondent coordinate obtainer 46 obtains, as the coordinates P1, the vector C where the angle α has changed to exceed the threshold value T2.

(Step S45)

The control unit 40 executes fixated scanning control, which is based on $V_{tx}$ and $V_{ty}$, until the angle α reaches the threshold value T1. The fixated scanning control in step S45 is similar to the fixated scanning control in step S43. Thus, as shown in FIG. 15H, the control unit 40 causes the driver 13 to move the probe 17 such that the tip 17c scans along the inclined surface 71a to approach the center of the V groove 71 and, as shown in FIG. 15I, the control unit 40 causes the driver 13 to move the probe 17 such that the tip 17c scans along the inclined surface 71a to move away from the center of the V groove 71.

(Step S46)

The control unit 40 executes fixated scanning control, which is based on $V_{tx}$ and $V_{ty}$, until the moving distance of the tip 17c from the position where the angle α reached the threshold value T1 reaches the predetermined length L. The fixated scanning control in step S46 is similar to the fixated scanning control in step S43. Thus, as shown in FIG. 15J, the control unit 40 causes the driver 13 to move the probe 17 such that the tip 17c scans along the inclined surface 71a to move away from the center of the V groove 71, and causes the driver 13 to stop the probe 17 when the moving distance of the tip 17c from the position where the angle α reached the threshold value T1 reaches the predetermined length L.

(Step S47)

The control unit 40 executes fixated scanning control, which is based on $V_{tx}$ and $V_{ty}$, such that the angle α approaches the threshold value T1. The fixated scanning control in step S47 is similar to the fixated scanning control in step S41. Thereby, as shown in FIG. 15K, the control unit 40 causes the driver 13 to move the probe 17 such that the tip 17c scans along the inclined surface 71a to approach the center of the V groove 71.

(Step S48)

As shown in FIG. 15K, the threshold value-correspondent coordinate obtainer 46 obtains, as the measured value, coordinates P2 for the tip 17c when the angle α has changed to exceed the threshold value T1. For example, the threshold value-correspondent coordinate obtainer 46 obtains, as the coordinates P2, the vector C where the angle α has changed to exceed the threshold value T1. In step S48, the coordinates of the tip 17c are obtained when the tip 17c approaches the center of the V groove 71 from a side opposite that in step S44. Thereafter, the control unit 40 causes the driver 13 to stop the movement of the probe 17. After step S48, the process advances to step S36.

(Steps S36 and S37)

As shown in FIG. 15L, the control unit 40 causes the driver 13 to retract the probe 17 (step S36). The V groove center calculator 47 calculates, as the measured value, coordinates P0 for the center of the V groove 71 based on the coordinates P1 and P2 (step S37). For example, the coordinates P0 are represented by Formula (15). The computer main body 21 saves the coordinates P0 as measurement data.

Moreover, in a case where, when the probe 17 has stopped in step S32, the value of the angle α is larger than the threshold value T2, the threshold value T1 and the threshold value T2 are swapped in step S34 and steps S41 through S48.

In addition, in a case where the angle α where the probe 17 has stopped in step S32 is between the two threshold values T1 and T2, step S34 is not performed and $V_{tx}$ and $V_{ty}$ in step S35 (steps S41 through S48) are represented by the following formulae.

[Formula 20]

$$|V_{tx}|=F \quad (20)$$

[Formula 21]

$$|V_{ty}|=0 \quad (21)$$

In such a case, when the speed of the probe 17 during steps S41 and S42 is divided in two, into a vector parallel to the Zw axis and a vector perpendicular to the Zw axis, a magnitude of the vector perpendicular to the Zw axis is constant at the fixed value F, and the direction of the vector perpendicular to the Zw axis is on the positive side of the Xw axis.

According to the present embodiment, the coordinates P1 are obtained (step S44) for the tip 17c where the angle α has changed to exceed the threshold value T2 during execution of a first scanning control (step S43) in which the probe 17 is moved such that the tip 17c scans along the inclined surface 71b of the V groove 71 to approach the center of the V groove 71. The coordinates P2 are obtained (step S48) for the tip 17c where the angle α has changed to exceed the threshold value T1 during execution of a second scanning control (step S47) in which the probe 17 is moved such that the tip 17c scans along the inclined surface 71a of the V groove 71 to approach the center of the V groove 71 from a side opposite that of the first scanning control (step S43). The coordinates P0 for the center of the V groove 71 are calculated based on the coordinates P1 and P2 (step S37). The coordinates P0 for the center of the V groove 71 are calculated based on the coordinates P1 obtained when the tip 17c is approaching the center of the V groove 71 and on the coordinates P2 obtained when the tip 17c is approaching the center of the V groove 71 from the opposite side. Therefore, the V groove center can be measured with a high degree of accuracy. In other words, the coordinates P0 are calculated based on the coordinates P1 and P2 obtained, respectively, when the tip 17c is moved from top to bottom across the inclined surface of the V groove 71 from two directions. Therefore, the V groove center can be measured with a high degree of accuracy. Furthermore, a method of obtaining the coordinates is uniform such that the coordinates of the tip 17c are obtained when the tip 17c approaches the center of the V groove 71. Therefore, the measured value for the V groove center is unlikely to be influenced by flexure of the stylus 17b, for example, and a degree of accuracy in repeated measurements is high.

Moreover, according to the present embodiment, in step S42, the probe 17 is moved until the moving distance of the tip 17c from the position where the angle α reached the threshold value T2 reaches the predetermined length L, and in step S46, the probe 17 is moved until the moving distance of the tip 17c from the position where the angle α reached the threshold value T1 reaches the predetermined length L. Therefore, the conditions at initiation of steps S43 and S47 are uniform. Accordingly, the degree of accuracy in repeated measurements is high.

Furthermore, according to the present embodiment, while executing the fixed-height scanning control in which the two planes 75 and 76 are simultaneously used as the confining surfaces, the tip 17c speed components $V_{tx'}$ and $V_{ty'}$ are detected (step S34), the tip 17c speed components $V_{tx'}$ and $V_{ty'}$ being perpendicular to the Zw axis when the angle α has reached one of the threshold value T1 and the threshold value T2, and the probe 17 speed components perpendicular to the Zw axis are controlled in step S35 (steps S41 through S48) based on $V_{tx'}$ and $V_{ty'}$. Accordingly, in step S35, scanning control can be achieved in which a trajectory of the tip 17c passes through the center of the V groove 71, which is formed in a conical shape, and a stop in the scanning when the tip 17c transits the center of the V groove 71 can be avoided.

Moreover, the present invention is not limited to the embodiments described above, and may be modified as needed without departing from the scope of the present invention.

In the above-noted examples, the program can be stored using various types of non-transitory computer-readable media and can be supplied to a computer. Non-transitory computer-readable media include various types of tangible storage media. Examples of non-transitory computer-readable media include a magnetic storage medium (for example, a flexible disk, magnetic tape, and a hard disk drive); a magnetooptical storage medium (for example, a magnetooptical disk); a CD-ROM (Read Only Memory); a CD-R; a CD-R/W; and a semiconductor memory (for example, a mask ROM, PROM (Programmable ROM), EPROM (Erasable PROM), flash ROM, and RAM (Random Access Memory)). In addition, the program may be supplied to the computer by various types of transitory computer readable media. Examples of transitory computer readable media include an electric signal, an optical signal, and an electromagnetic wave. Transitory computer readable media can supply the program to the computer via a wired communication channel such as electric wires and optical fibers, or via a wireless communication channel.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A form measuring apparatus comprising:
a probe having a tip configured to measure a measured object;
a driver configured to move the probe;
a probe coordinate detector configured to detect coordinates of the probe;
a deflection vector detector configured to detect a deflection vector of the probe;
an angle calculator configured to calculate an angle created between a direction of the deflection vector and a predetermined direction;
a tip coordinate calculator configured to calculate the coordinates of the tip based on the coordinates and the deflection vector of the probe;
a controller configured to execute a first scanning control, causing the driver to move the probe such that the tip scans along an inclined surface of a V groove to approach a center of the V groove, the controller further configured to execute a second scanning control, causing the driver to move the probe such that the tip scans along the inclined surface of the V groove to approach the center of the V groove from a side opposite that of the first scanning control;
a threshold value-correspondent coordinate obtainer configured to obtain, as first coordinates, coordinates of the tip where the angle has changed to exceed a first threshold value during execution of the first scanning control and obtaining, as second coordinates, coordinates of the tip where the angle has changed to exceed a second threshold value during execution of the second scanning control; and
a V groove center calculator configured to calculate coordinates of the V groove center based on the first coordinates and the second coordinates.

2. The form measuring apparatus according to claim 1, wherein:
the controller is further configured to execute a third scanning control before executing the first scanning control, the third scanning control causing the driver to move the probe such that the tip scans along the inclined surface of the V groove to move away from the V groove center,
in the third scanning control, the controller causes the driver to move the probe until a moving distance of the tip from a position where the angle reached the first threshold value reaches a predetermined length,
the controller is further configured to execute a fourth scanning control before executing the second scanning control, the fourth scanning control causing the driver to move the probe such that the tip scans along the inclined surface of the V groove to move away from the V groove center, and
in the fourth scanning control, the controller causes the driver to move the probe until the moving distance of the tip from a position where the angle reached the second threshold value reaches a predetermined length.

3. The form measuring apparatus according to claim 2, wherein, in the first and second scanning controls, the controller executes a fixed-height scanning control, where a fixed plane perpendicular to a length direction of the V groove is defined as a confining surface.

4. The form measuring apparatus according to claim 2, wherein:
the controller is configured to execute a fifth scanning control causing the driver to move the probe such that the tip scans along the inclined surface of the V groove to approach the V groove center,
in the fifth scanning control, the controller generates a first target speed vector of the probe for fixed-height scanning control where a first plane parallel to the predetermined direction is defined as a confining surface, generates a second target speed vector of the probe for fixed-height scanning control where a second plane parallel to the predetermined direction and perpendicular to the first plane is defined as a confining surface, causes the driver to move the probe based on a combined vector of the first target speed vector and the second target speed vector, and detects, as a detected speed component, a component of the tip speed that is perpendicular to the predetermined direction and where the angle has reached one of the first threshold value and the second threshold value,
the first plane and the second plane move together with the tip, and
in the first and second scanning controls, the controller controls a component of the probe speed that is perpendicular to the predetermined direction based on the detected speed component.

5. The form measuring apparatus according to claim 1, wherein, in the first and second scanning controls, the controller executes a fixed-height scanning control, where a fixed plane perpendicular to a length direction of the V groove is defined as a confining surface.

6. The form measuring apparatus according to claim 1, wherein:
   the controller is configured to execute a further scanning control causing the driver to move the probe such that the tip scans along the inclined surface of the V groove to approach the V groove center,
   in the further scanning control, the controller generates a first target speed vector of the probe for fixed-height scanning control where a first plane parallel to the predetermined direction is defined as a confining surface, generates a second target speed vector of the probe for fixed-height scanning control where a second plane parallel to the predetermined direction and perpendicular to the first plane is defined as a confining surface, causes the driver to move the probe based on a combined vector of the first target speed vector and the second target speed vector, and detects, as a detected speed component, a component of the tip speed that is perpendicular to the predetermined direction and where the angle has reached one of the first threshold value and the second threshold value,
   the first plane and the second plane move together with the tip, and
   in the first and second scanning controls, the controller controls a component of the probe speed that is perpendicular to the predetermined direction based on the detected speed component.

7. A measurement method of finding a V groove center comprising:
   obtaining, as first coordinates, coordinates of a tip of a probe where an angle created between a deflection direction of the probe and a predetermined direction changes to exceed a first threshold value during a first scanning where the probe is moved such that the tip scans along an inclined surface of a V groove to approach a center of the V groove;
   obtaining, as second coordinates, coordinates of the tip where the angle changes to exceed a second threshold value during a second scanning where the probe is moved such that the tip scans along the inclined surface of the V groove to approach the V groove center from a side opposite that of the first scanning; and
   calculating coordinates of the V groove center based on the first coordinates and the second coordinates.

* * * * *